US012703449B1

(12) United States Patent
Labbe et al.

(10) Patent No.: US 12,703,449 B1
(45) Date of Patent: Aug. 11, 2026

(54) MOTORCYCLE WITH ACCESSORY MOUNTING SYSTEM

(71) Applicant: BOMBARDIER RECREATIONAL PRODUCTS INC., Valcourt (CA)

(72) Inventors: David Labbe, Acton Vale (CA); Benoit Morissette, Cantons de Valcourt (CA); Benoit Gilbert, Sherbrooke (CA); Marc-Etienne Bessette, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 443 days.

(21) Appl. No.: 18/361,140

(22) Filed: Jul. 28, 2023

Related U.S. Application Data

(60) Provisional application No. 63/393,340, filed on Jul. 29, 2022.

(51) Int. Cl.

| | |
|---|---|
| ***B62J 9/27*** | (2020.01) |
| ***B62J 17/04*** | (2006.01) |
| ***B62K 11/14*** | (2006.01) |

(52) U.S. Cl.
CPC ................. *B62J 9/27* (2020.02); *B62J 17/04* (2013.01); *B62K 11/14* (2013.01)

(58) Field of Classification Search
CPC .................................... B62J 9/27; B62J 17/04
See application file for complete search history.

(56) References Cited

U.S. PATENT DOCUMENTS

| | | | | |
|---|---|---|---|---|
| 4,696,509 A * | 9/1987 | Yagasaki | B62J 17/04 296/78.1 |
| 6,203,093 B1 * | 3/2001 | Suzuki | B62J 17/00 296/78.1 |
| 8,123,273 B2 * | 2/2012 | Tsuda | B62J 17/04 296/180.1 |
| 8,777,531 B2 | 7/2014 | Massicotte et al. | |
| 9,937,972 B2 * | 4/2018 | Nakano | B62J 17/04 |
| 11,939,021 B2 * | 3/2024 | Saeki | B62J 45/00 |
| 2012/0186065 A1 * | 7/2012 | Willey | B62J 17/04 248/201 |
| 2023/0042667 A1 * | 2/2023 | Engl | B62J 17/04 |

FOREIGN PATENT DOCUMENTS

| | | | |
|---|---|---|---|
| WO | WO-2011155053 A1 * | 12/2011 | B60Q 1/0433 |
| WO | 2023/017423 A1 | 2/2023 | |

* cited by examiner

*Primary Examiner* — Minnah L Seoh
*Assistant Examiner* — Hosam Shabara
(74) *Attorney, Agent, or Firm* — BCF LLP

(57) ABSTRACT

A motorcycle has: a frame; a seat; a rear wheel; a front wheel; a motor operatively connected to the rear wheel for driving the rear wheel; a handlebar operatively connected to the front wheel for steering the front wheel; and a front structure connected to the frame and being disposed at least in part forward of the handlebar and vertically higher than the front wheel. The front structure defines two first apertures on either side thereof. The front structure defines a second aperture on a top thereof. The two first apertures and the second aperture are each adapted to receive a coupler for connecting an accessory to the front structure. The coupler is at least one of a quick-attach anchor and a quick-attach accessory connector. The two first apertures and the second aperture are longitudinally forward of the handlebar. A windshield for a motorcycle is also disclosed.

20 Claims, 25 Drawing Sheets

MOTORCYCLE WITH ACCESSORY MOUNTING SYSTEM

CROSS-REFERENCE

The present application claims priority to U.S. Provisional Patent Application No. 63/393,340, filed Jul. 29, 2022, the entirety of which is incorporated herein by reference.

TECHNICAL FIELD

The present technology relates to motorcycles with accessory mounting systems.

BACKGROUND

Due to their relatively small size, motorcycles do not typically provide a lot of cargo space. For this reason, various accessories are provided, such as saddlebags, that can be attached to the motorcycle to increase the cargo space. However, many such accessories cannot be easily installed and removed from the motorcycle. As a result, many motorcycle owners prefer to leave these accessories on the motorcycle permanently once they have been installed, even though they do not need them all the time.

Other accessories, such as cameras, can be mounted to a motorcycle. However, these will be mounted to parts of the motorcycle, such as the handlebar, that were not originally designed to receive such accessories. As a result, the accessories are provided with various mounts and adapters to fit different motorcycles and these mounts and adapters can have many parts. Again, many motorcycle owners prefer to leave these accessories, or at least the mounts/adapters, on the motorcycle permanently once they have been installed, even though they do not need them all the time.

Therefore, there is a desire for a motorcycle having an accessory mounting system that can overcome at least some of the above-described drawbacks.

SUMMARY

It is an object of the present technology to ameliorate at least some of the inconveniences present in the prior art.

According to one aspect of the present technology, there is provided a motorcycle having: a frame; a seat supported by the frame; a rear wheel operatively connected to the frame; a front wheel operatively connected to the frame; a motor operatively connected to the rear wheel for driving the rear wheel; a handlebar operatively connected to the front wheel for steering the front wheel; and a front structure connected to the frame and being disposed at least in part forward of the handlebar and vertically higher than the front wheel. The front structure defines two first apertures on either side thereof. The front structure defines a second aperture on a top thereof. The two first apertures and the second aperture are each adapted to receive a coupler for connecting an accessory to the front structure. The coupler is at least one of a quick-attach anchor and a quick-attach accessory connector. The two first apertures and the second aperture are longitudinally forward of the handlebar.

In some embodiments, the motorcycle also has the accessory; and at least one coupler received in at least one of the first and second apertures and connecting the accessory to the front structure.

In some embodiments, the at least one coupler is integrated with the accessory.

In some embodiments, the at least one coupler is separate from the accessory. The accessory has a third aperture. The at least one coupler is inserted through the third aperture in the accessory and the one of the first and second apertures to connect the accessory to the front structure.

In some embodiments, a headlight is connected to the frame. The front structure has a headlight housing housing the headlight. The two first apertures are defined on either side of the headlight housing.

In some embodiments, the second aperture is defined in a top of the headlight housing.

In some embodiments, the front structure also has a display connected to the headlight housing. The two first apertures are disposed below the display. The second aperture is disposed forward of the display.

In some embodiments, the front structure also has a display connected to the handlebar. The second aperture is defined in the display.

In some embodiments, each of the two first apertures extends laterally inward and rearward from its respective side of the headlight housing.

In some embodiments, the accessory is a windshield connected to the headlight housing via the two first apertures and the second aperture.

In some embodiments, the windshield has two arms. The at least one coupler includes two accessory connectors. The two accessory connectors are two pegs. Each arm has one of the two pegs. Each peg is received in a corresponding one the first apertures.

In some embodiments, each of the two peg clips onto the headlight housing.

In some embodiments, the second aperture is defined in a top of the headlight housing. The at least one coupler also includes the anchor. The anchor is mounted to the windshield. The anchor is received in the second aperture.

In some embodiments, the windshield has: a front headlight cover covering the headlight; and a wind deflector extending upward and rearward from the headlight cover.

In some embodiments, the first and second apertures are hexagonal.

According to another aspect of the present technology, there is provided a windshield for a motorcycle having: a wind deflector; and two arms connected to the wind deflector. Each arm has a peg extending laterally inwardly from the arm. The pegs are configured to be received in apertures defined in the motorcycle.

In some embodiments, an anchor is mounted to a rear side of the wind deflector. The anchor is configured for connecting the windshield to the motorcycle.

In some embodiments, the anchor has: a latch; and a lever connected to the latch to turn the latch between a locked position and an unlocked position.

In some embodiments, the latch has a pair of cams defining a hexagonal shape. The pegs are hexagonal pegs.

In some embodiments, the windshield also has a headlight cover is configured to cover a headlight of the motorcycle. The wind deflector extends upward and rearward from the headlight cover. The two arms extend rearward and laterally outward from the headlight cover.

It must be noted that, as used in this specification and the appended claims, the singular form “a”, “an” and “the” include plural referents unless the context clearly dictates otherwise.

As used herein, the term “about” in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

For purposes of the present application, terms related to spatial orientation when referring to a vehicle and components in relation to the vehicle, such as "vertical", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
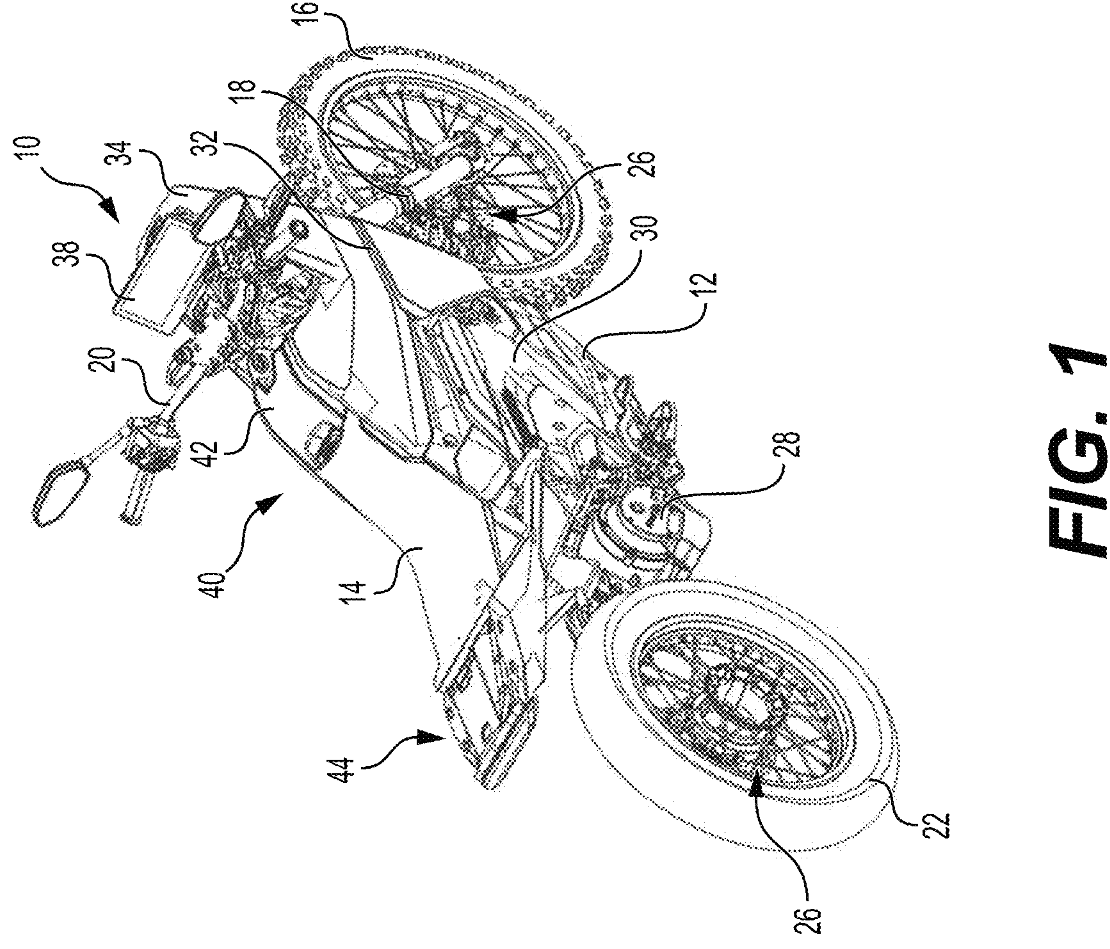
FIG. 1 is a perspective view, taken from a rear, right side, of an embodiment of a motorcycle.
Figure 2:
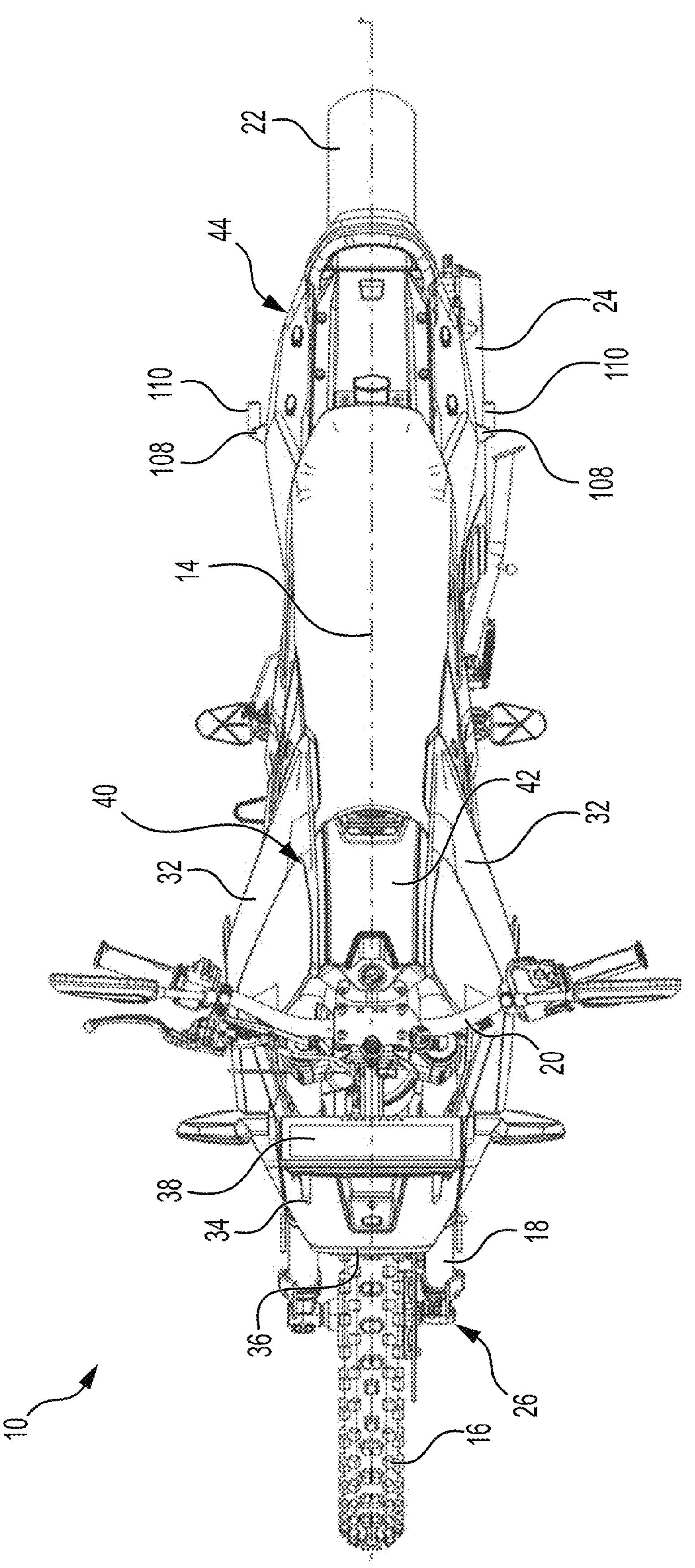
FIG. 2 is a top plan view of the motorcycle of FIG. 1.
Figure 3:
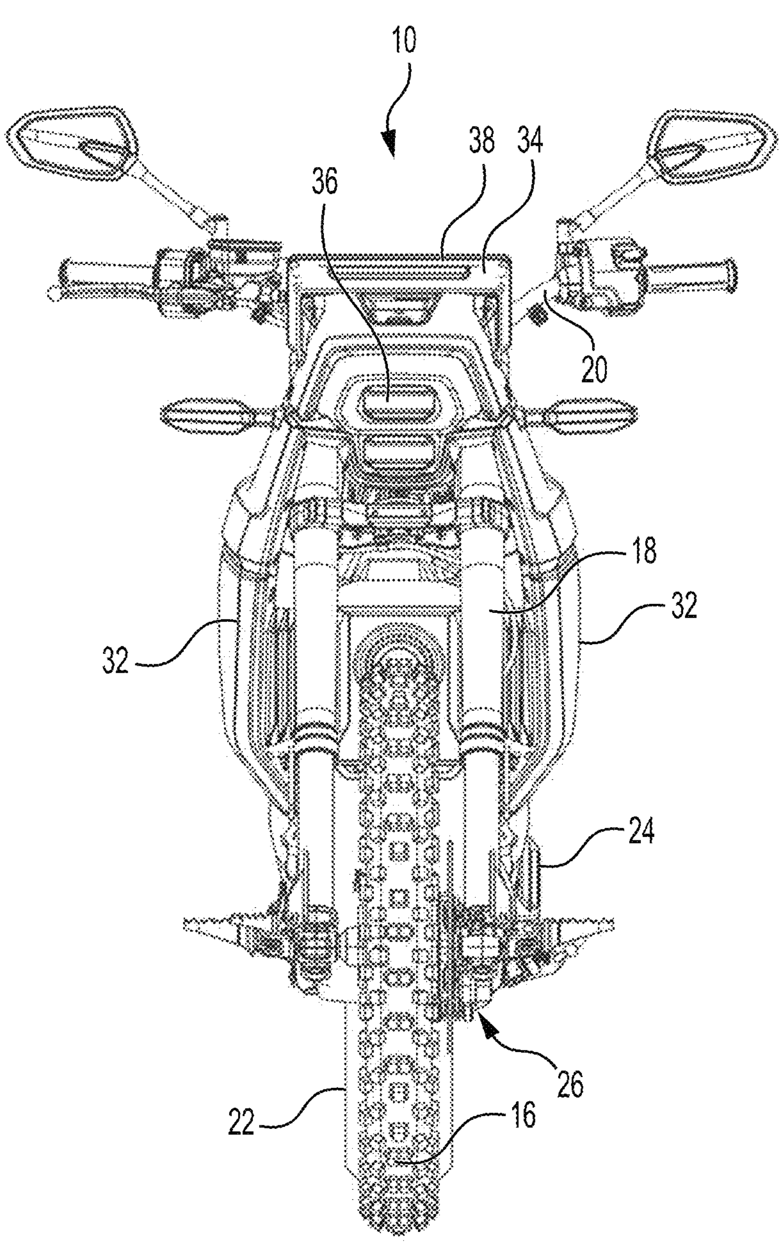
FIG. 3 is a front elevation view of the motorcycle of FIG. 1.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references used in different embodiments refer to similar elements.

With reference to FIGS. 1 to 5, a motorcycle 10 has a frame 12. A seat 14 is connected to the frame 12. A front wheel 16 is pivotally mounted to the frame 12 via a front fork 18. The front fork 18 is connected to a handlebar 20 that is used to turn the front fork 18 and thereby steer the front wheel 16. The handlebar 20 is disposed forward of the seat 14. A rear wheel 22 is pivotally connected to the frame 12 by a swingarm 24. Each wheel 16, 22 is provided with a disk brake assembly 26.

An electric motor 28 is mounted to the frame 12. The electric motor 28 drives the rear wheel 22 via a flexible driving member (not shown) such as a chain or a belt. The flexible driving member is covered by the swingarm 24. The electric motor 28 is powered by a battery pack 30 mounted to the frame 12. It is contemplated that in alternative embodiments, the electric motor 28 could be replaced by another type of motor such as an internal combustion engine, in which case the battery pack 30 would be replaced by a fuel tank.

Various body panels 32 are mounted to the frame 12. A headlight housing 34 is mounted to the frame 12 and houses a headlight 36. A display 38 is mounted to the headlight housing 34 in front of the handlebar 20. As such, when the handlebar 20 is turned, the display 38 does not move relative to the frame 12. The display 38 displays various information to the driver of the motorcycle 10 such as speed, map and GPS data, battery charge level, media information, etc. The headlight housing 34 and the display 38 together define a front structure of the motorcycle 10.

A glove box 40 is provided in front of the seat 14. The glove box 40 has a pivotable and removable cover 42. A rear rack 44 is provided behind the seat 14 and is connected to the frame 12.

Figure 6:
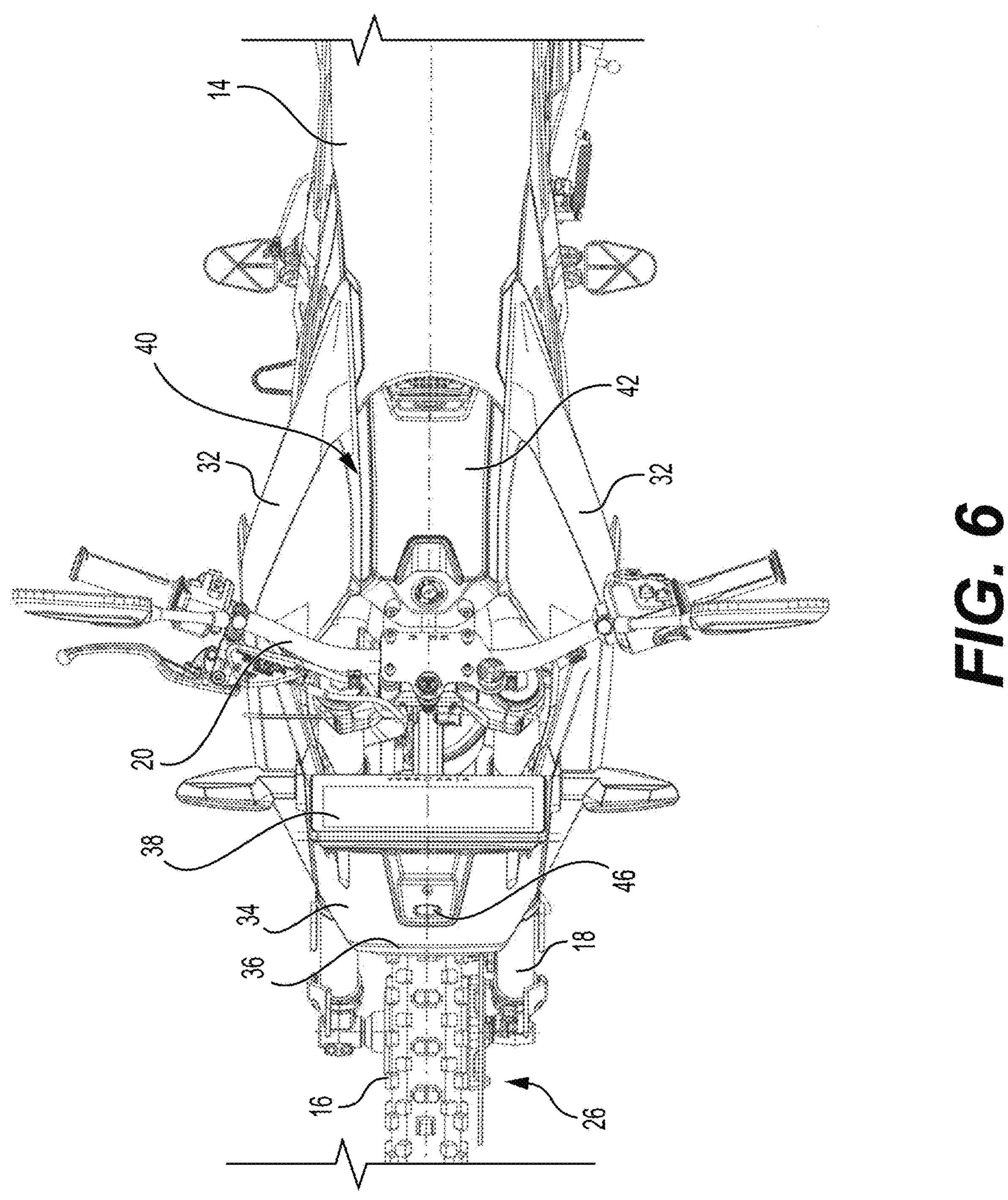
FIG. 6 is a close-up, top plan view of a front portion of the motorcycle of FIG. 1.
Figure 7:
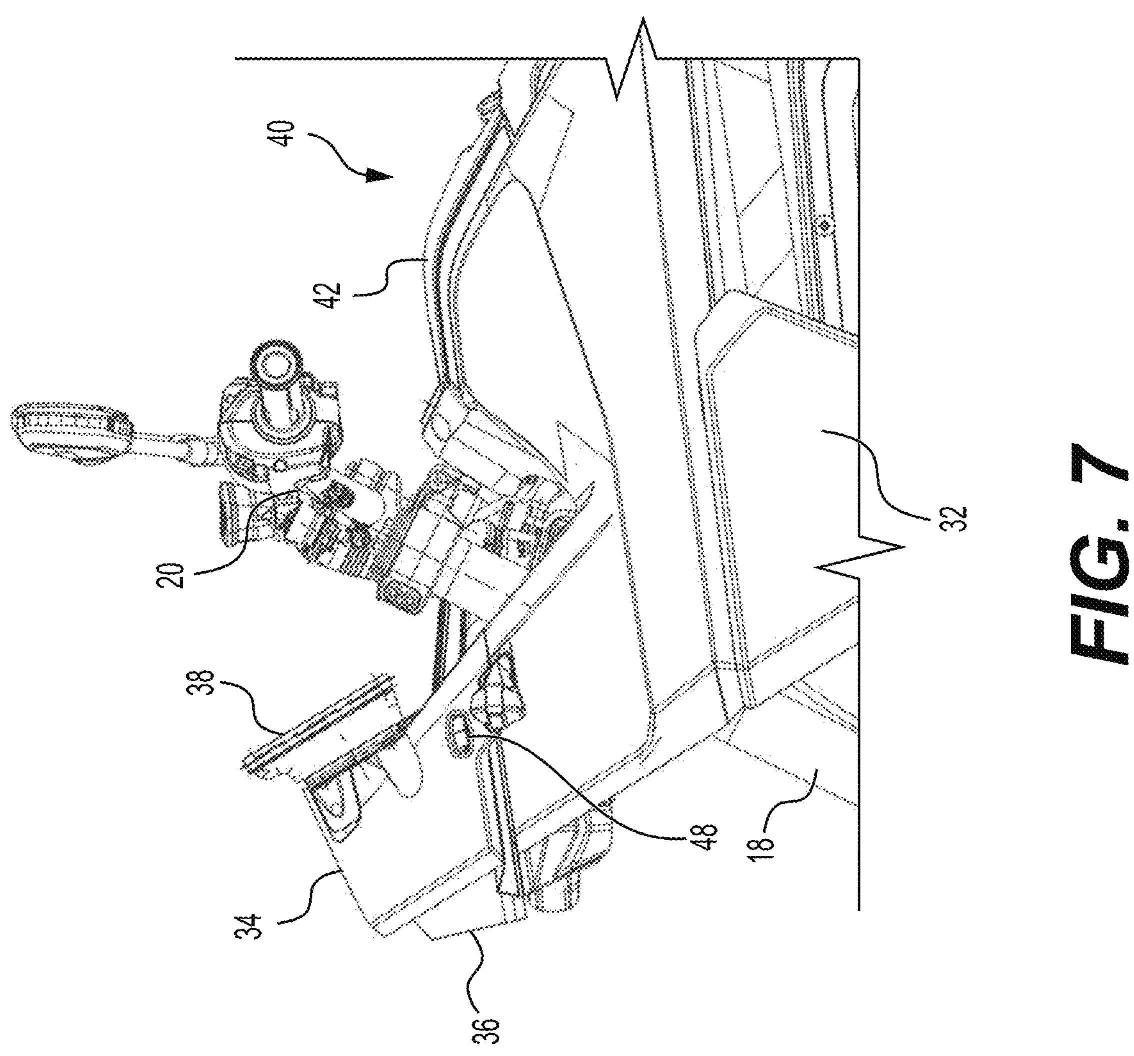
FIG. 7 is a close-up, left side elevation view of a front portion of the motorcycle of FIG. 1.

With reference to FIGS. 6 and 7, the headlight housing 34 defines a top aperture 46 and two side apertures 48. The top aperture 46 is disposed on the top of the headlight housing 34 in front of the display 38 forward of the handlebar 20. The top aperture 46 is laterally centered on the motorcycle 10. From the top of the headlight housing 34, the top aperture 46 extends downward and rearward. The side apertures 48 are provided on the left and right sides of the headlight housing 34, at a rear thereof. As can be seen in FIG. 7 for the left side aperture 48, the side apertures 48 are disposed below the display 38 and forward of the handlebar 20. From their respective sides of the headlight housing 34, the side apertures 48 extend laterally inward and rearward. As can be seen, the apertures 46, 48 are hexagonal. In some embodiments, each of the apertures 46, 48 is at least 20 mm wide by 5 mm long. In some embodiments, each of the apertures 46, 48 has a surface area of at least 100 $mm^2$. By using couplers such as the anchors 200, 400 (see FIGS. 22, 23, 25) or the accessory connector 300 (see FIG. 24), various accessories can be connected to the headlight housing 34 using the apertures 46, 48. The anchors 200, 400 and the accessory connector 300 will be described in more detail below. Accessories integrating the features of the anchors 200, 400 and the accessory connector 300 can also be connected to the headlight housing 34. The accessories can include, but are not limited to, storage containers, speakers, and cameras. The aperture 46, 48 can be used to mount one accessory each, or two or three of the apertures 46, 48 can be used together to mount one accessory.

For example, to mount a camera to the top of the headlight housing 34, the camera is disposed on the headlight housing 34 such that a hexagonal aperture defined in a mount of the camera is aligned with the top aperture 46. An anchor 200 is then partially inserted through the hexagonal aperture in the camera mount and through the top aperture 46 such that the portions of the camera mount surrounding the hexagonal aperture in the camera mount are held between part of the anchor and the top of the headlight housing 34. The anchor 200 is then locked, thereby securing the camera to the top of the headlight housing 34. It is contemplated that the features of the anchor 200 that permit the connection of the anchor 200 to the headlight housing 34 via the top aperture 46 could be integrated into the camera mount, in which case the camera mount would not need a hexagonal aperture.

Figure 12:
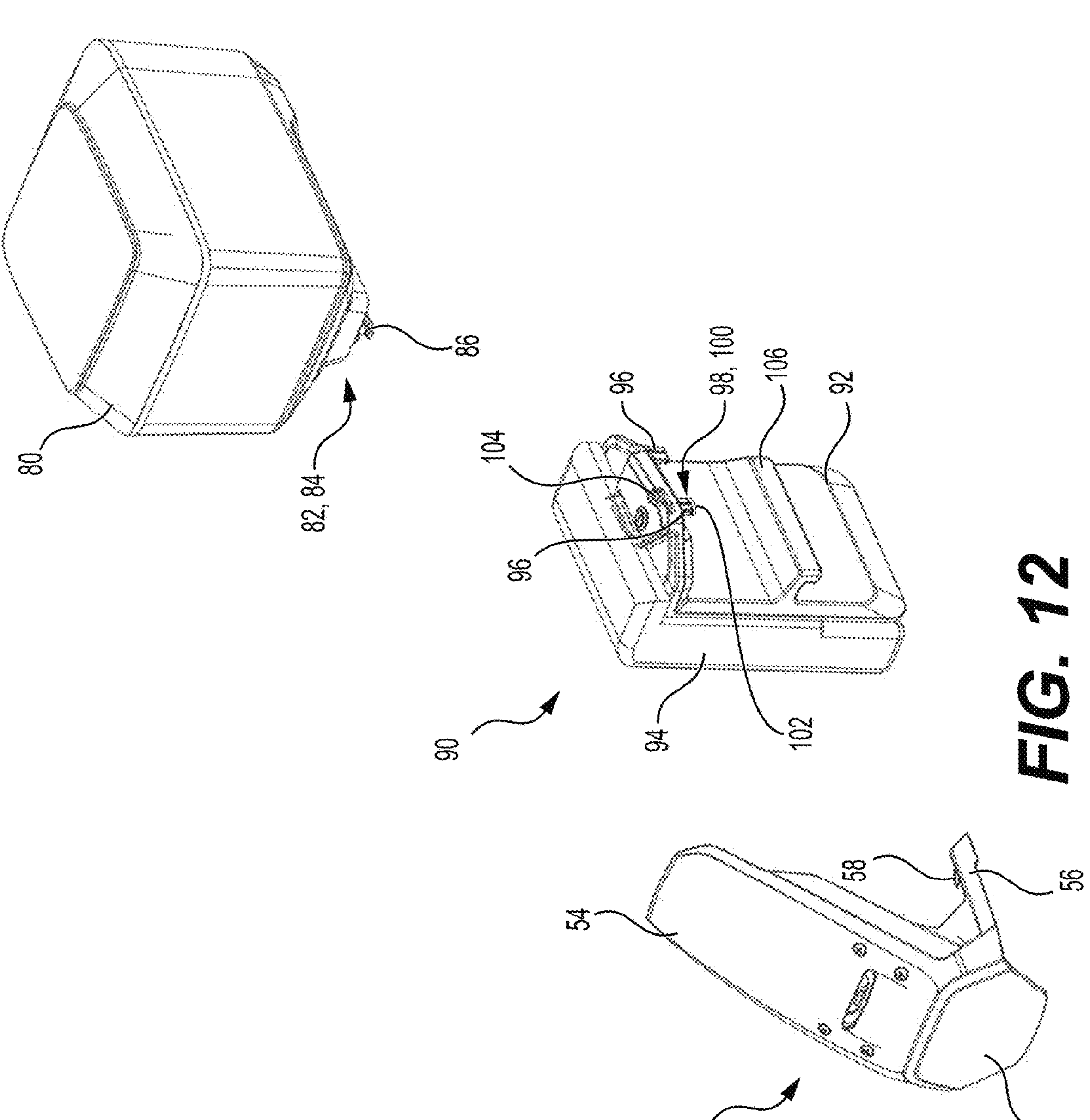
FIG. 12 is a perspective view, taken from a front, left side of a windshield, a cargo box, and a right saddlebag of FIG. 9.
Figure 13:
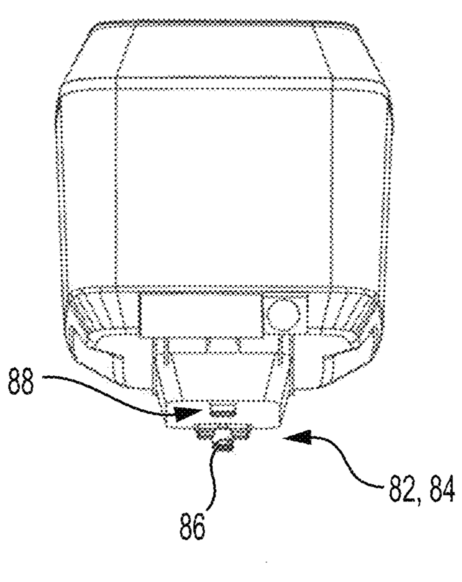
FIG. 13 is a rear elevation view of the windshield, the cargo box, and the right saddlebag of FIG. 12.
Figure 13:
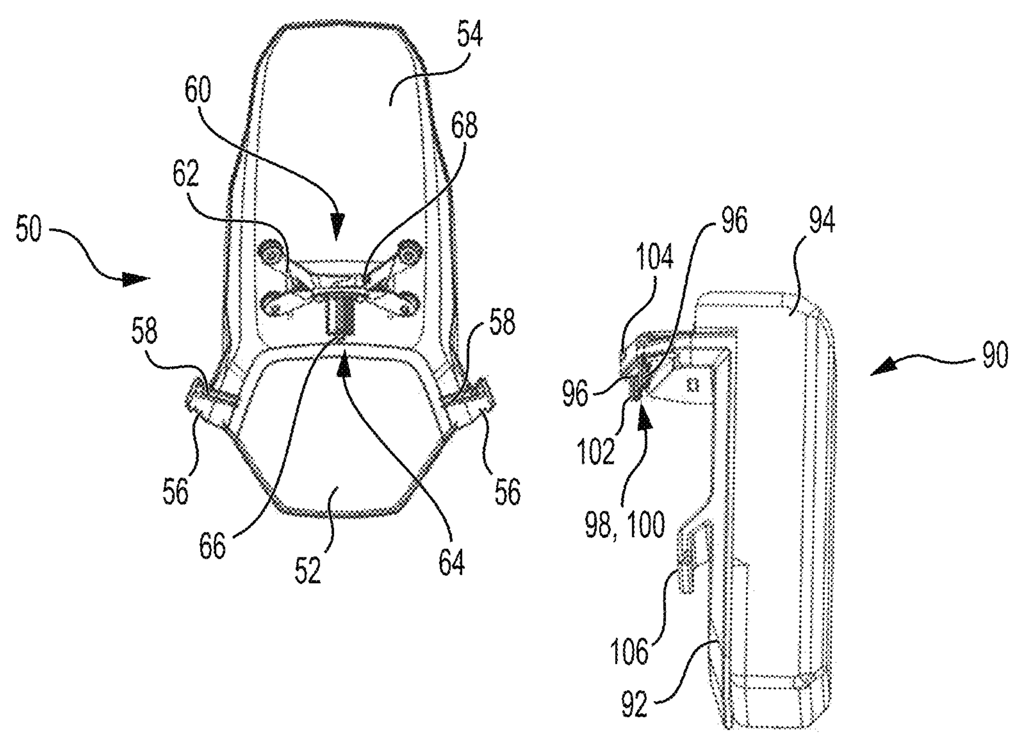
Figure 14:
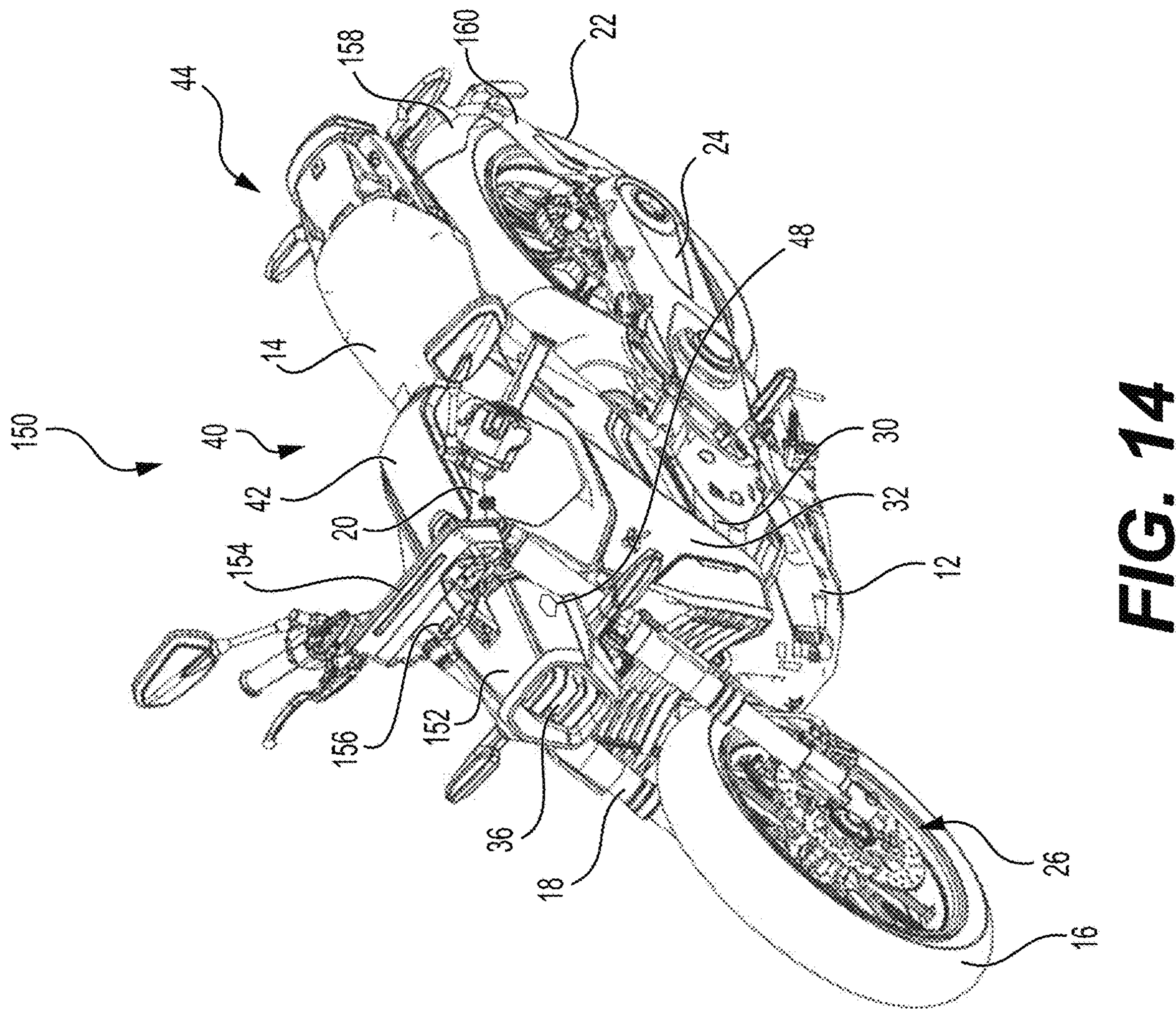
FIG. 14 is a perspective view, taken from a front, left side, of an alternative embodiment of the motorcycle of FIG. 1.
Figure 15:
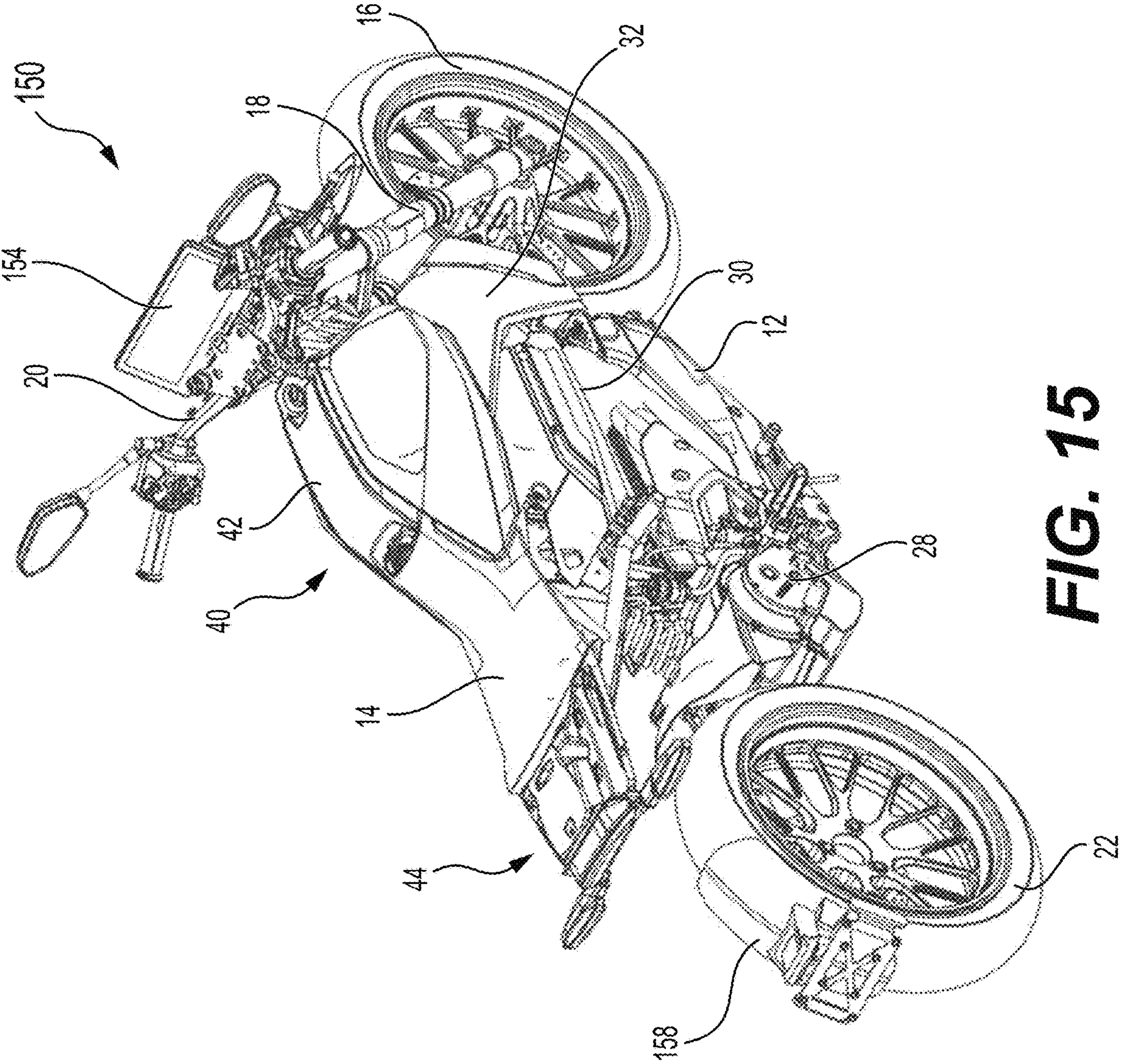
FIG. 15 is a perspective view, taken from a rear, right side, of the motorcycle of FIG. 14.

With reference to FIGS. 9, 10, 12 and 13, one of the accessories that can be mounted to the headlight housing 34 using the aperture 46, 48 is a windshield 50. The windshield 50 is made from clear material, but it is contemplated that only certain portions of the windshield 50 could be made from clear material. With reference to FIGS. 12 and 13, the windshield 50 has a front headlight cover 52, a wind deflector 54 extending upward and rearward from the headlight cover 52, and two sides arm 56 extending rearward and laterally outward from the headlight cover 52. As best seen in FIG. 13, each arm 56 has a hexagonal peg 58 extending laterally inward and downward from a rear end portion thereof. The pegs 58 are complementary in shape to the side aperture 48. As can also be seen in FIG. 13, an anchor 60 is mounted to the rear side of the wind deflector 54. The anchor 60 has a generally X-shaped mount 62 fastened to the wind deflector 54. The mount 62 rotationally supports a latch 64. The lower end of the latch 64 has a pair of cams 66 defining a hexagonal shape that is complementary to the shape of the top aperture 46. The top end of the latch 64 is connected to a lever 68 that can be used to turn the latch 64 between a locked and an unlocked position. In the unlocked position, the cams 66 are oriented to fit through the top aperture 46. In the locked position, the cams 66 are turned by about 90 degrees from their unlocked position, and as such cannot pass thought the top aperture 46.

Figure 9:
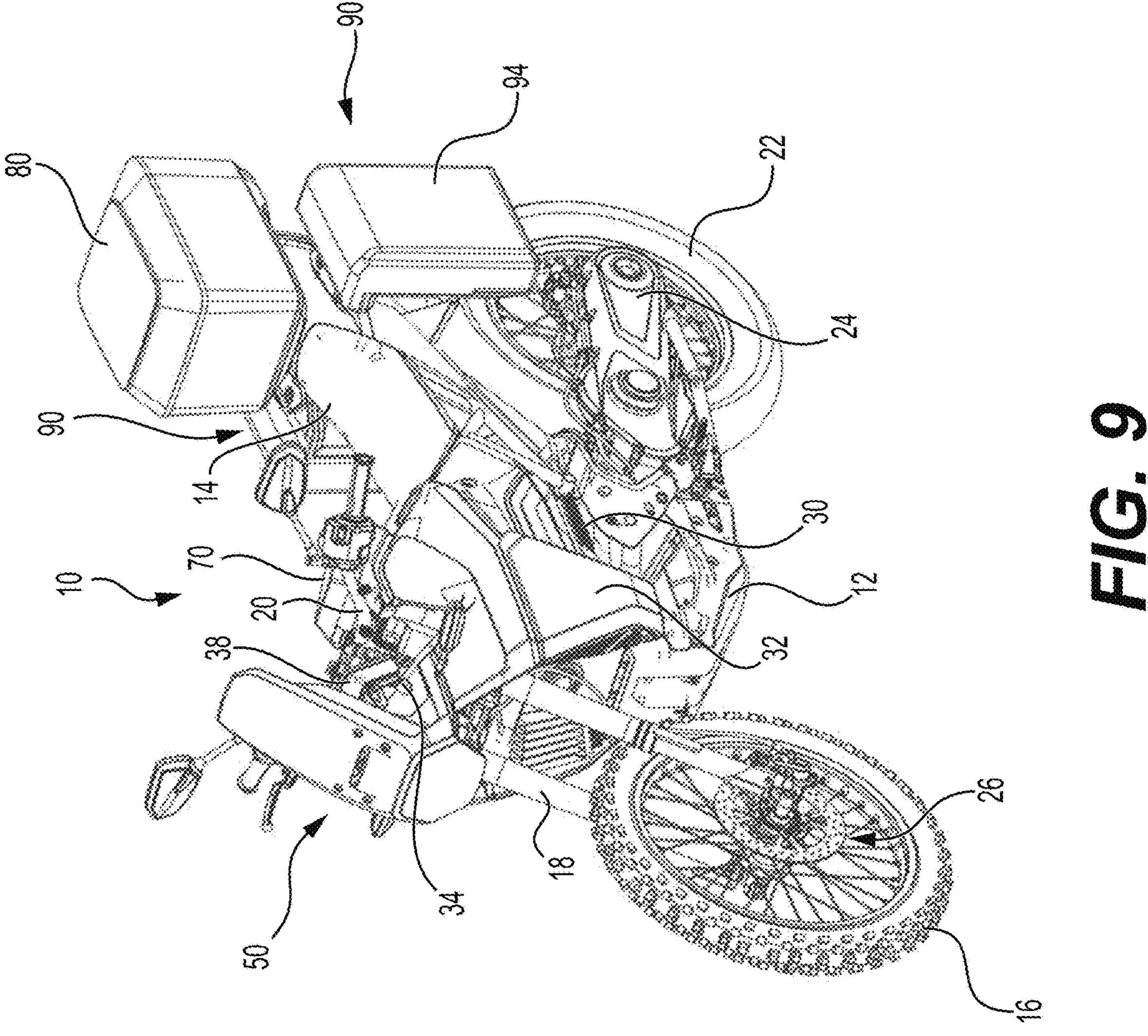
FIG. 9 is a perspective view, taken from a front, left side, of the motorcycle of FIG. 1 with accessories mounted thereto.
Figure 10:
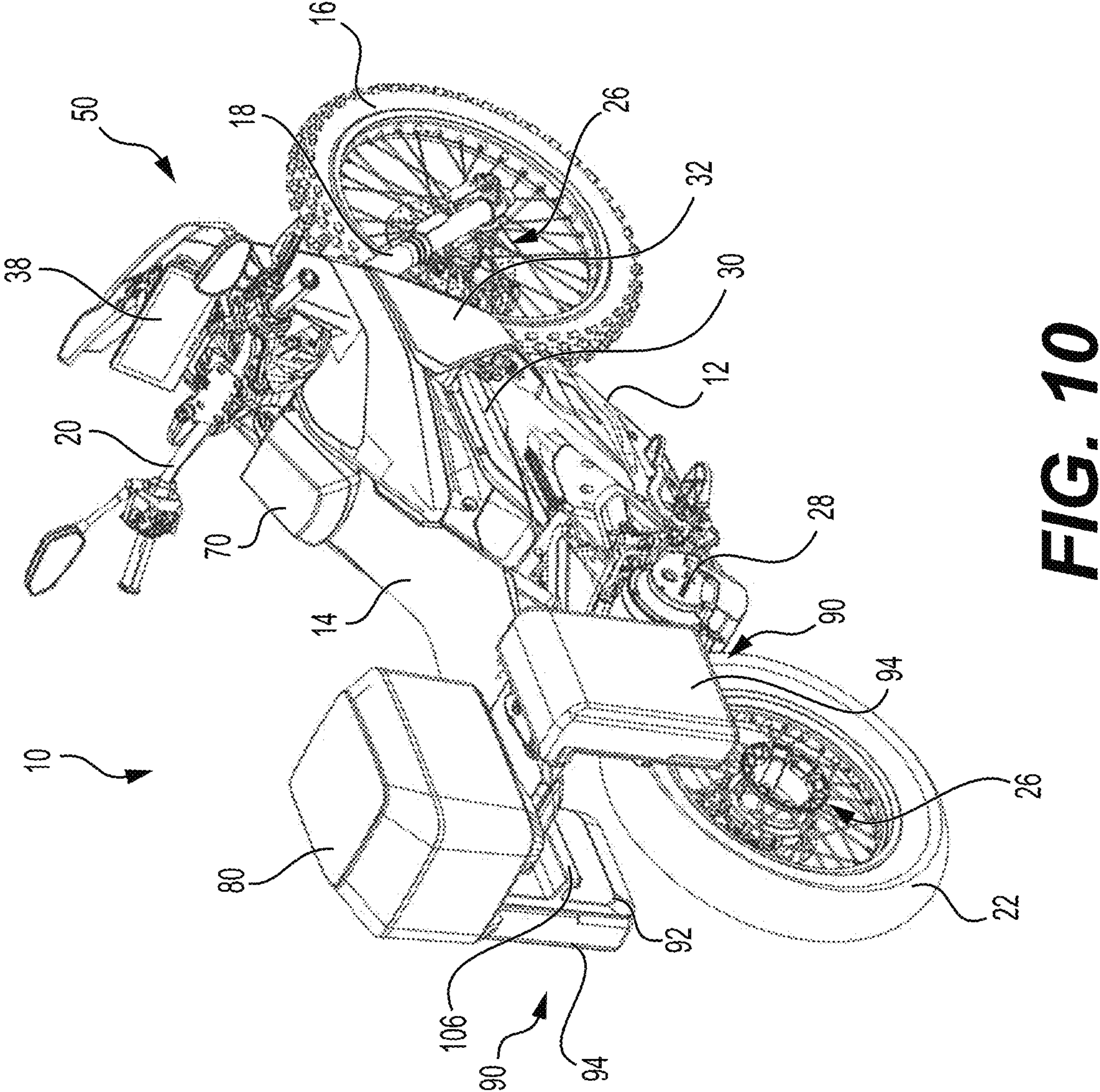
FIG. 10 is a perspective view, taken from a rear, right side, of the motorcycle and accessories of FIG. 9.
Figure 11:
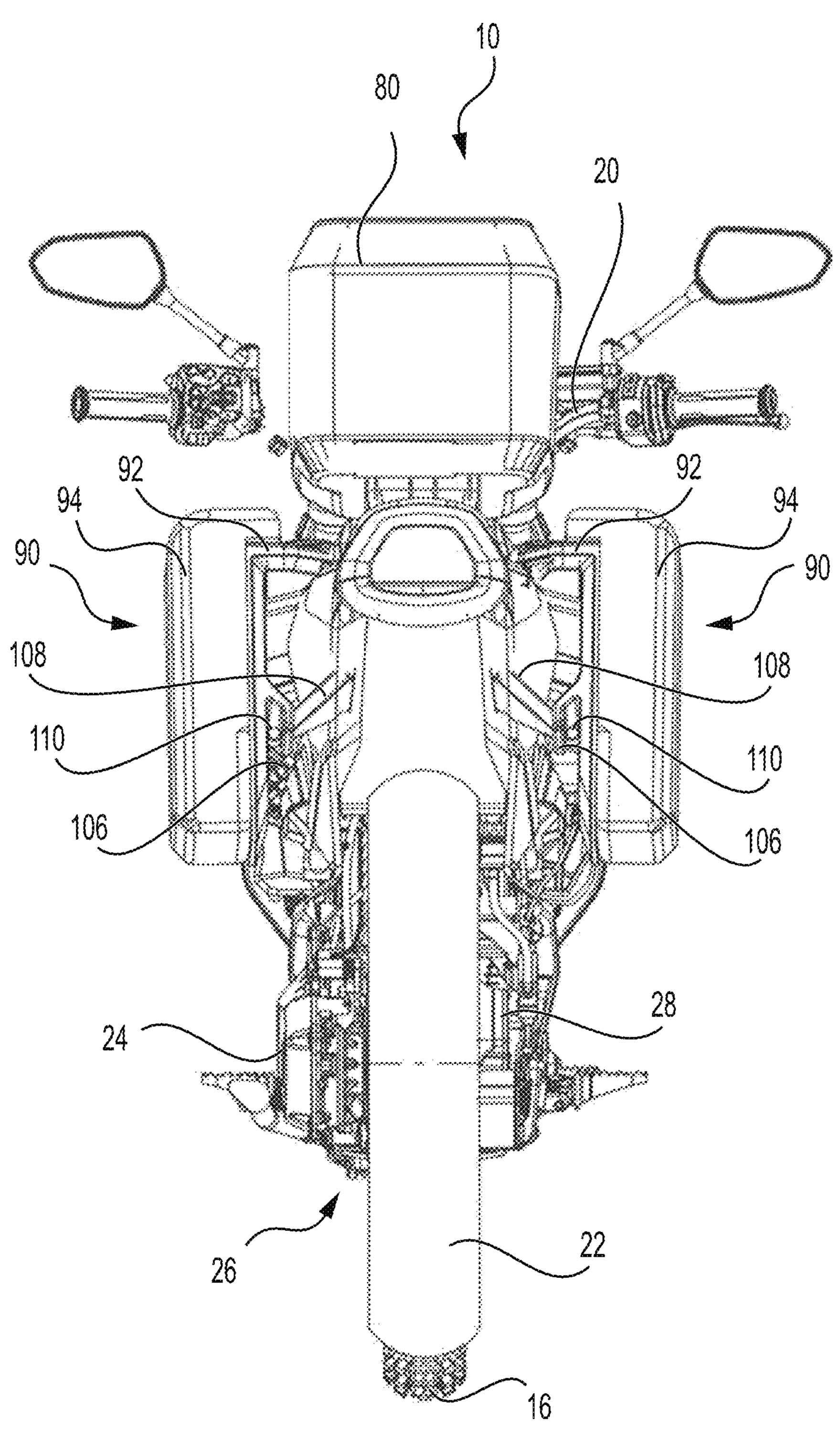
FIG. 11 is a rear elevation view of the motorcycle and accessories of FIG. 9.

To connect the windshield 50 to the headlight housing 34, the windshield 50, with the latch 64 in the unlocked position, is slid over the headlight housing 34 causing the side arms 56 to deflect outwardly. The windshield 50 is maneuvered to insert the cams 66 of the latch 64 through the top aperture 46 and to align the pegs 58 with the side apertures 48. Once the pegs 58 are aligned with the side apertures 48, the side arms 56 spring inwardly, pushing the pegs 58 into the side apertures 48, causing the pegs 58 to clip onto the headlight housing 34. Once the pegs 58 are inside the side apertures 48 and the cams 66 are inserted through the top aperture 46, the lever 68 is turned to move the latch 64 to the locked position. As they are being turned, the cams 66 apply a downward force on a lower surface of the top of the headlight housing 34, thereby securing the anchor 60, and as a result the windshield 50, to the headlight housing 34. As can be seen in FIGS. 9 and 10, when the windshield 50 is connected to the headlight housing 34, the headlight cover 52 covers the headlight 36 and the wind deflector 65 extends over the display 38.

With reference to FIGS. 9 and 10, by removing the cover 42 of the glove box 40, a bag 70 can be partially inserted inside the glove box 40 and be fastened to a bottom of the glove box 40. The glove box 40 has a hexagonal aperture (not shown) at a bottom thereof that is similar to the hexagonal aperture 72 shown in the glove box 40 of FIG. 16. By using an anchor 200 or 400 the bag 70 can be connected to the glove box 40 using the aperture 72. The anchor 200 or 400 is partially inserted through a hexagonal aperture in the bottom of the bag 70 and through the aperture 72 such that the portions of the bag 70 surrounding the hexagonal aperture in the bag 70 are held between part of the anchor 200 or 400 and the bottom of the glove box 70. The anchor 200 or 400 is then locked, thereby securing the bag 70 to the glove box 40. It is contemplated that the features of the anchor 200 or 400 that permit the connection of the anchor 200 or 400 to the glove box 40 via the aperture 72 could be integrated into the bag 70, in which case the bag 70 would not need a hexagonal aperture.

Figure 8:
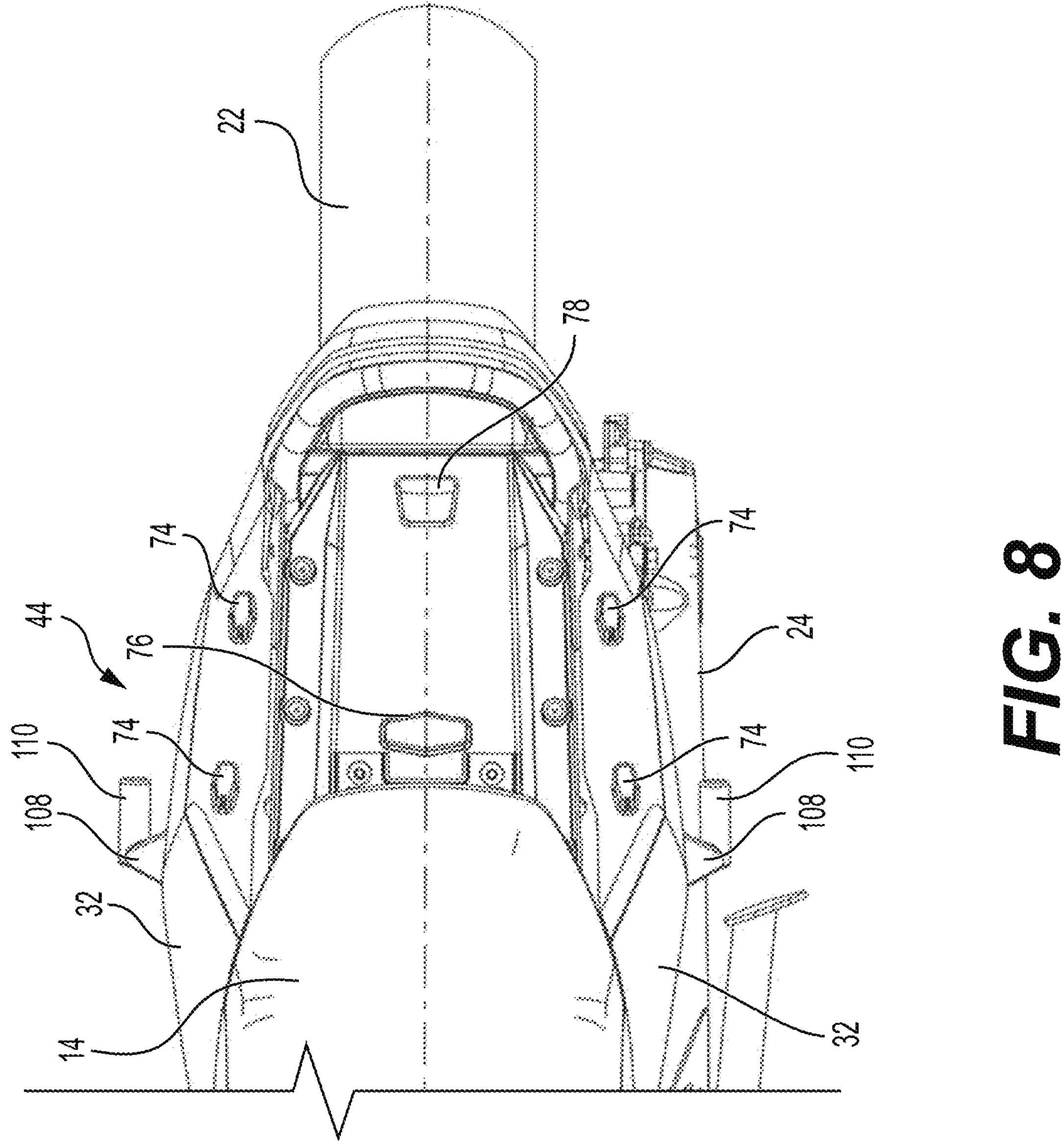
FIG. 8 is a close-up, top plan view of a rear portion of the motorcycle of FIG. 1.

With reference to FIG. 8, the rear rack 44 defines two side apertures 74 on a right side thereof, two side apertures 74 on a left side thereof, a central aperture 76 near a front thereof which is laterally centered, and a groove 78 near a rear thereof which is laterally centered. As can be seen, the aperture 76 is larger than the apertures 74. The apertures 74, 76 and the groove 78 can be used to attach various accessories to the rear rack 44, some of which will be described below. By using anchors such as the anchors 200, 400 (see FIGS. 22, 23, 25) or accessory connectors such as the accessory connector 300 (see FIG. 24), various accessories can be connected to the rear rack 44. Accessories integrating the features of the anchors 200, 400 and the accessory connector 300 can also be connected to the rear rack 44. When no accessory is connected to the rear rack 44, a cover (not shown) which integrates features of the anchor 200 or 400 is connected to the rear rack 44 via one or more of the apertures 74, 76 to cover the rear rack 44 and provide a more aesthetically pleasing look.

With reference to FIGS. 9 to 13, one of the accessories that can be mounted to the rear rack 44 using the aperture 76 and the groove 78 is a cargo box 80. As can be seen in FIGS. 12 and 13, an anchor 82 is mounted to the bottom, front portion of the cargo box 80. The anchor 82 has a latch 84. The lower end of the latch 84 has a pair of cams 86 defining a hexagonal shape that is complementary to the shape of the aperture 76. The top end of the latch 84 is connected to a lever (not shown) disposed inside the cargo box 80. The lever can be used to turn the latch 84 between a locked position and an unlocked position. In the unlocked position, the cams 86 are oriented to fit through the aperture 76. In the locked position, the cams 76 are turned by about 90 degrees from their unlocked position, and as such cannot pass thought the aperture 76. A tongue 88 is mounted to the bottom, rear portion of the cargo box 80.

To connect the cargo box 80 to the rear rack 44, the cargo box 80, with the latch 84 in the unlocked position is maneuvered to insert the tongue 88 inside the groove 78. Then, the front of the cargo box 80 is lowered to insert the cams 86 of the latch 84 through the aperture 76. The lever is then turned to move the latch 84 to the locked position. As they are being turned, the cams 86 apply a downward force on a lower surface of the rear rack 44, thereby securing the anchor 82, and thereby the cargo box 80, to the rear rack 44.

It is contemplated that a passenger seat (not shown) having an anchor and tongue similar to the anchor 82 and tongue 88 of the cargo box 80 could be connected to the rear rack 44 is a similar manner.

With continued reference to FIGS. 9 to 13, one of the accessories that can be mounted to the rear rack 44 using two of the apertures 74 is a saddlebag 90. As can be seen in FIGS. 9 and 10, left and right saddlebags 90 can be mounted to the rear rack 44 (one per pair of apertures 74). The left and right saddlebags 90 are mirror images of each other. For simplicity, only the right saddlebag 90 and its connection to the rear rack 44 using the right apertures 74 will be described in detail.

As can be seen in FIGS. 12 and 13, the saddlebag 90 includes a mount 92 and a bag 94 connected to the mount 92. The bag 94 can be soft or rigid. The mount 92 has two downwardly extending pegs 96. The front peg 96 form part of an anchor 98 having a latch 100. The lower end of the latch 100 has a pair of cams 102 defining a hexagonal shape that is complementary to the shape of the aperture 74. The top end of the latch 100 is connected to a lever 104. The lever 104 can be used to turn the latch 100 between a locked position and an unlocked position. In the unlocked position, the cams 102 are oriented to fit through the aperture 74. In the locked position, the cams 102 are turned by about 90 degrees from their unlocked position, and as such cannot pass thought the aperture 74. A hook 106 extends inwardly from a central portion of the mount 92.

Figure 4:
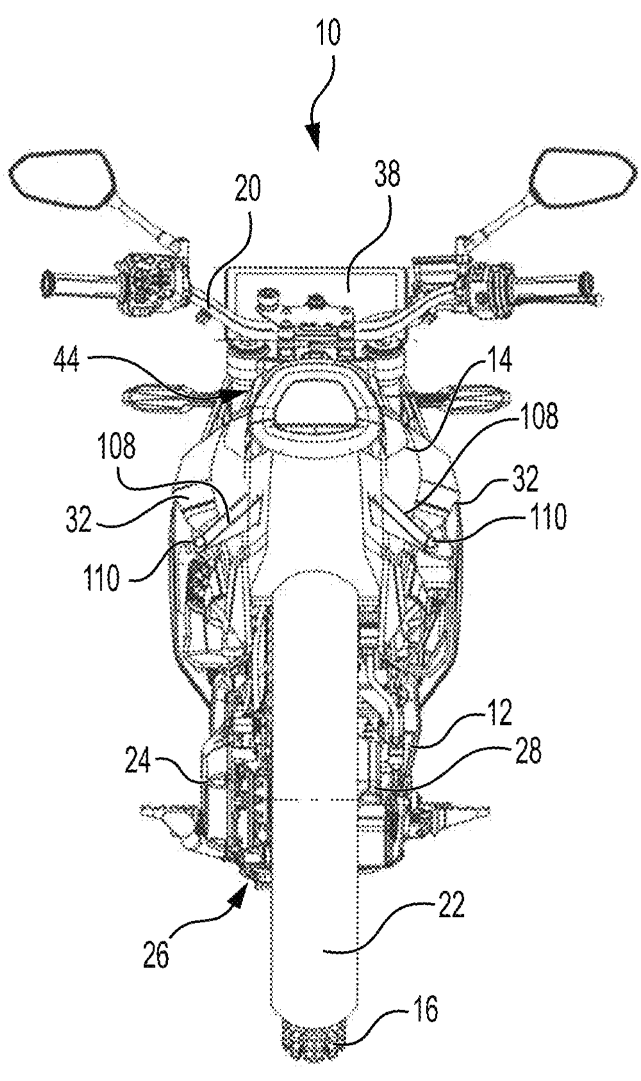
FIG. 4 is a rear elevation view of the motorcycle of FIG. 1.
Figure 5:
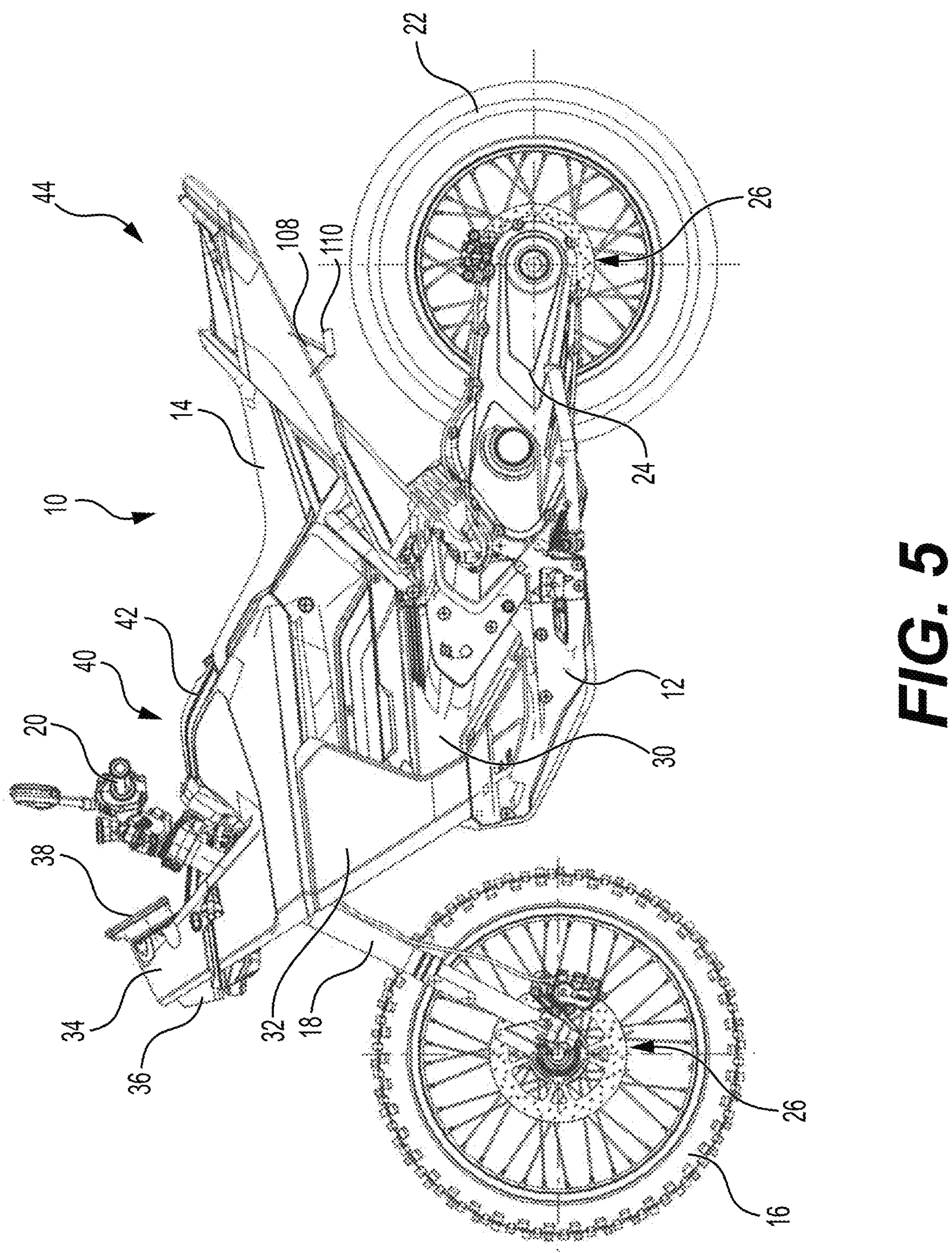
FIG. 5 is a left side elevation view of the motorcycle of FIG. 1.

With reference to FIGS. 4, 5 and 8, to help support the saddlebag 90, the motorcycle 10 is provided with an arm 108 connected to a rear right side of the frame 12. The arm 108 extends outward and downward from the frame 12. A rod 110 extends rearward from the lower end of the arm 108, generally longitudinally and horizontally. A corresponding arm 108 and rod 110 are also provided on the left side of the motorcycle 10 for the left saddlebag 90

To connect the saddlebag 90 to the rear rack 44, the saddlebag 90, with the latch 100 in the unlocked position is maneuvered to insert the pegs 96 inside the apertures 74 and to make the hook 106 rest on the rod 110. The lever 104 is then turned to move the latch 100 to the locked position. As they are being turned, the cams 102 apply a downward force on a lower surface of the rear rack 44, thereby securing the anchor 98, and thereby the saddlebag 90, to the rear rack 44.

Turning now to FIGS. 14 to 21, features of a motorcycle 150 will be described. The motorcycle 150 is an alternative embodiment of the motorcycle 10. For simplicity, features of the motorcycle 150 that are similar to features of the motorcycle 10 described above have been labeled with the same reference numerals and will not be described again.

Figure 21:
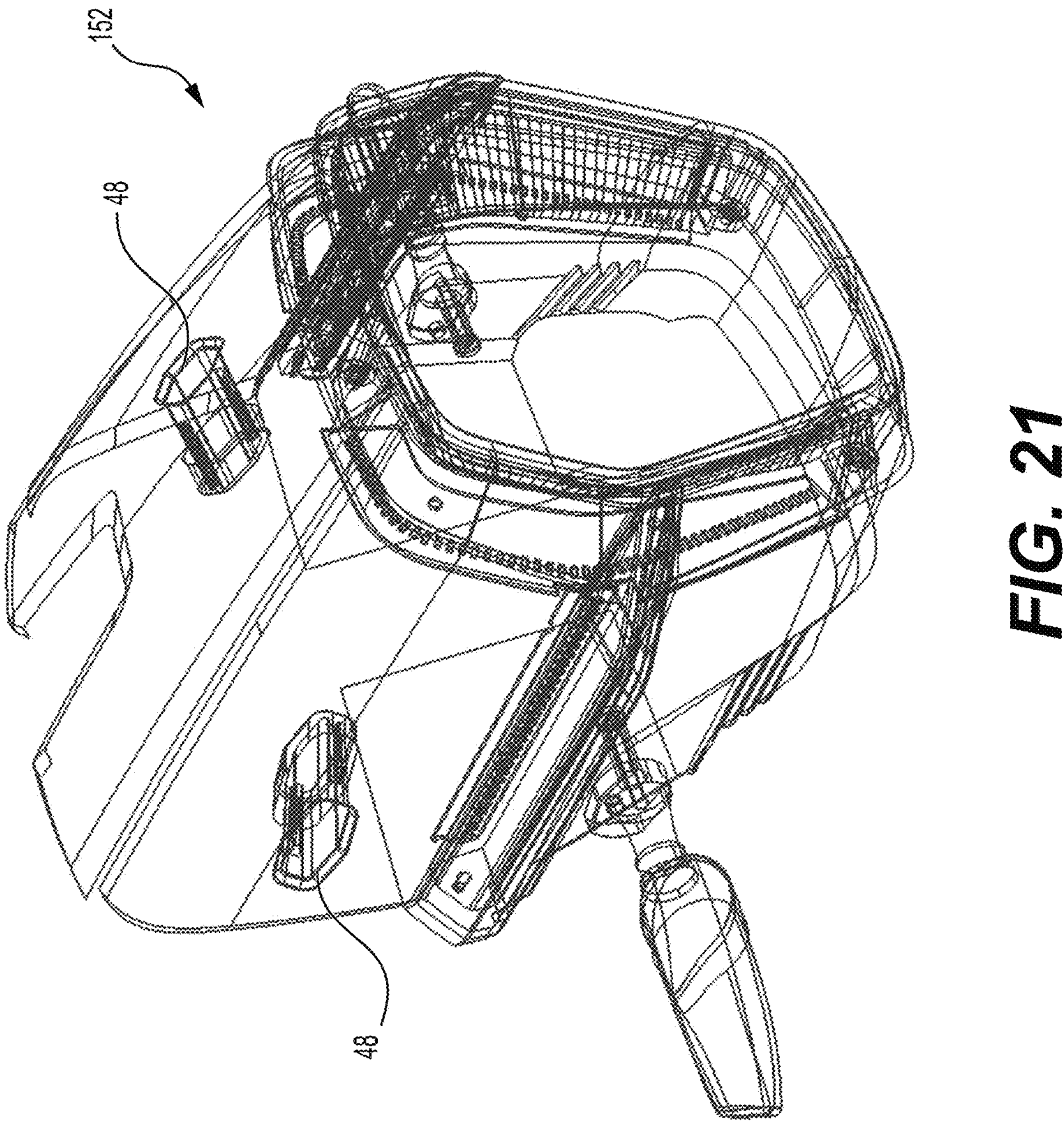
FIG. 21 is a perspective view, take from a front, right side, of a headlight housing of the motorcycle of FIG. 14, with the headlight housing being shown in transparency.

The motorcycle 150 has a headlight housing 152 defining two side apertures 48, but contrary to the headlight housing 34, the headlight housing 153 does not define a top aperture 46. As best seen in FIG. 21, the side apertures 48 are provided on the left and right sides of the headlight housing 152, at a rear thereof and forward of the handlebar 20. From their respective sides of the headlight housing 152, the side apertures 48 extend laterally inward and rearward. As can be seen, the apertures 48 are hexagonal. By using couplers such as the anchors 200, 400 (see FIGS. 22, 23, 25) or the accessory connector 300 (see FIG. 24), various accessories can be connected to the headlight housing 152 using the apertures 48. Accessories integrating the features of the anchors 200, 400 and the accessory connector 300 can also be connected to the headlight housing 152. The accessories can include, but are not limited to, storage containers, speakers, and cameras. The apertures 48 can be used to mount one accessory each, or both of the apertures 48 can be used together to mount one accessory.

Figure 16:
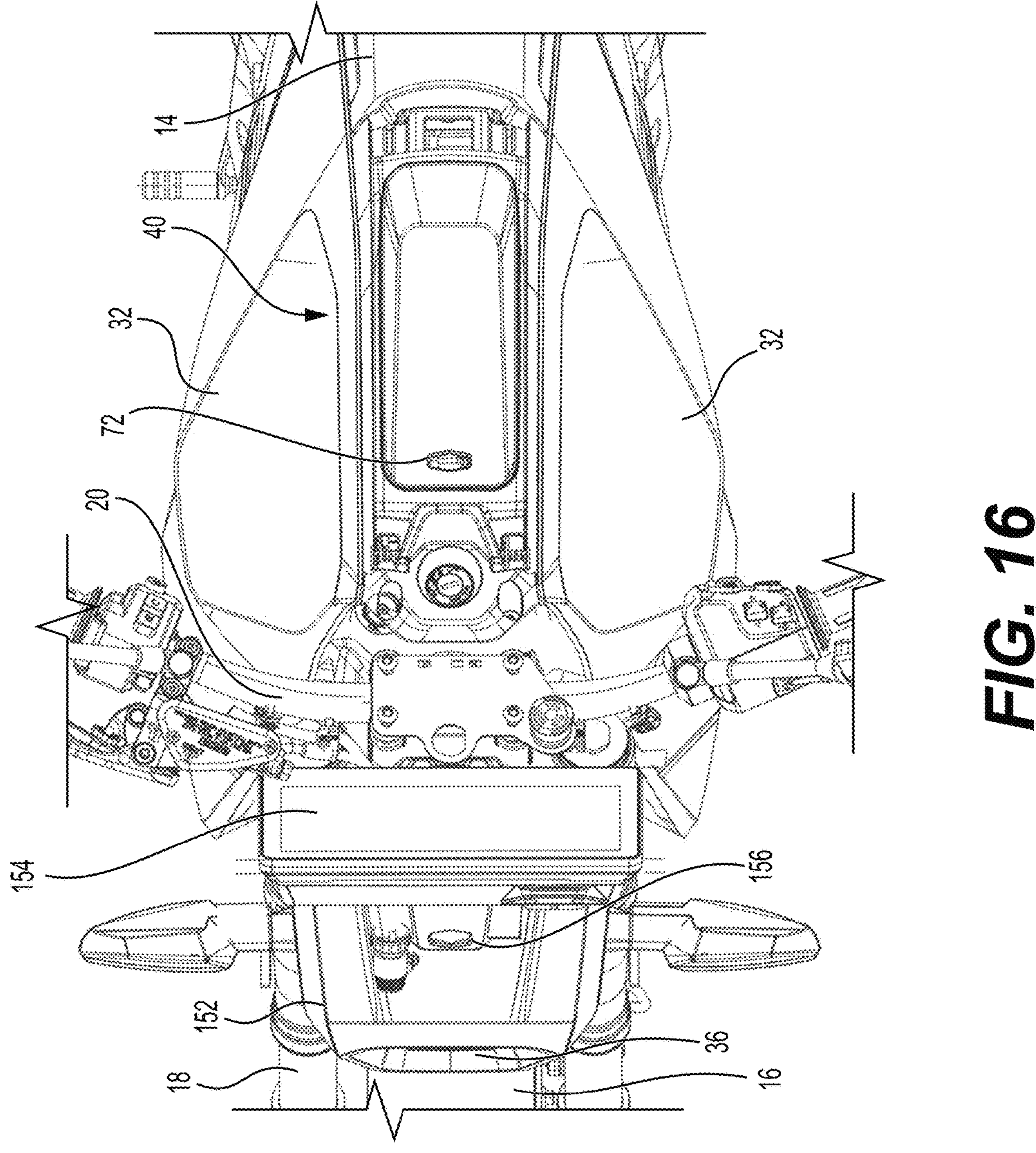
FIG. 16 is a close-up, top plan view of a front portion of the motorcycle of FIG. 14, with a cover of a glove box being removed.
Figure 17:
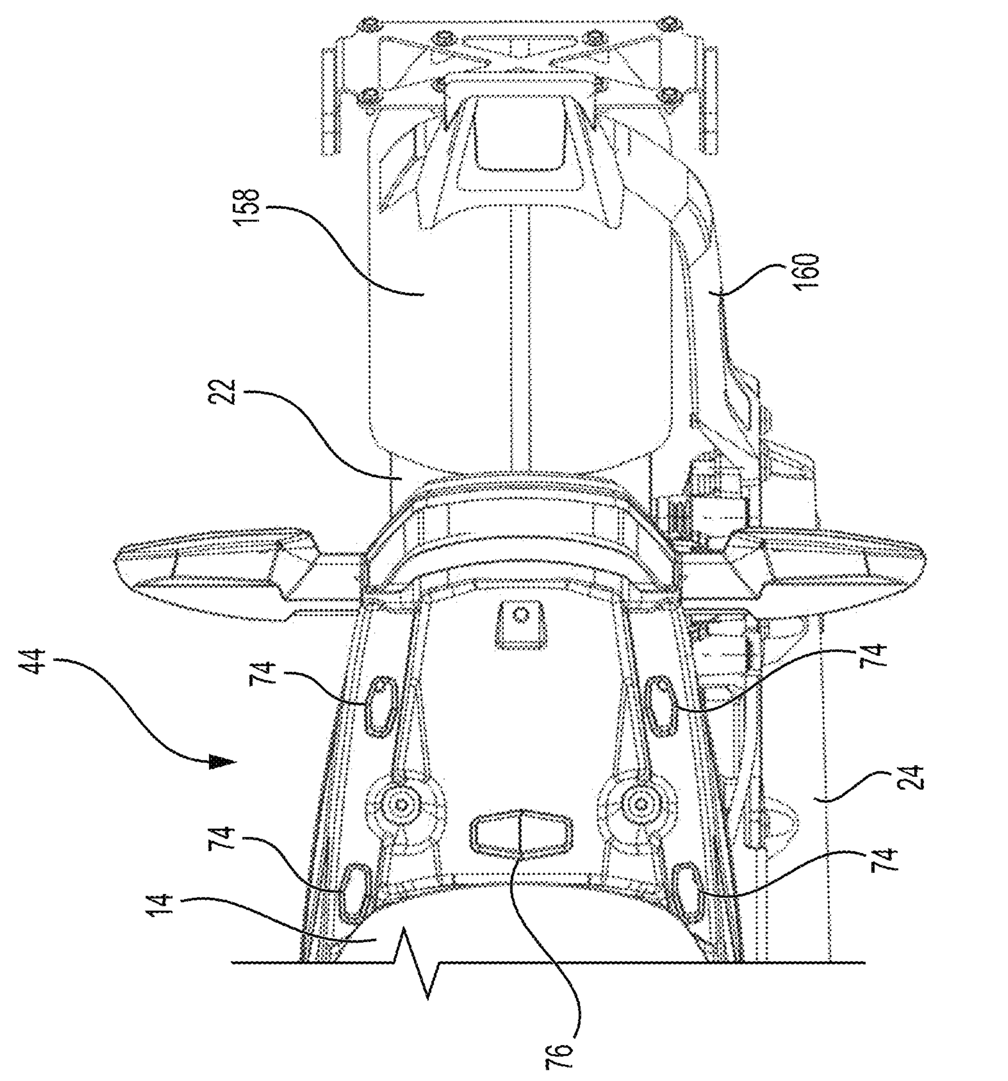
FIG. 17 is a close-up, top plan view of a rear portion of the motorcycle of FIG. 14.
Figure 18:
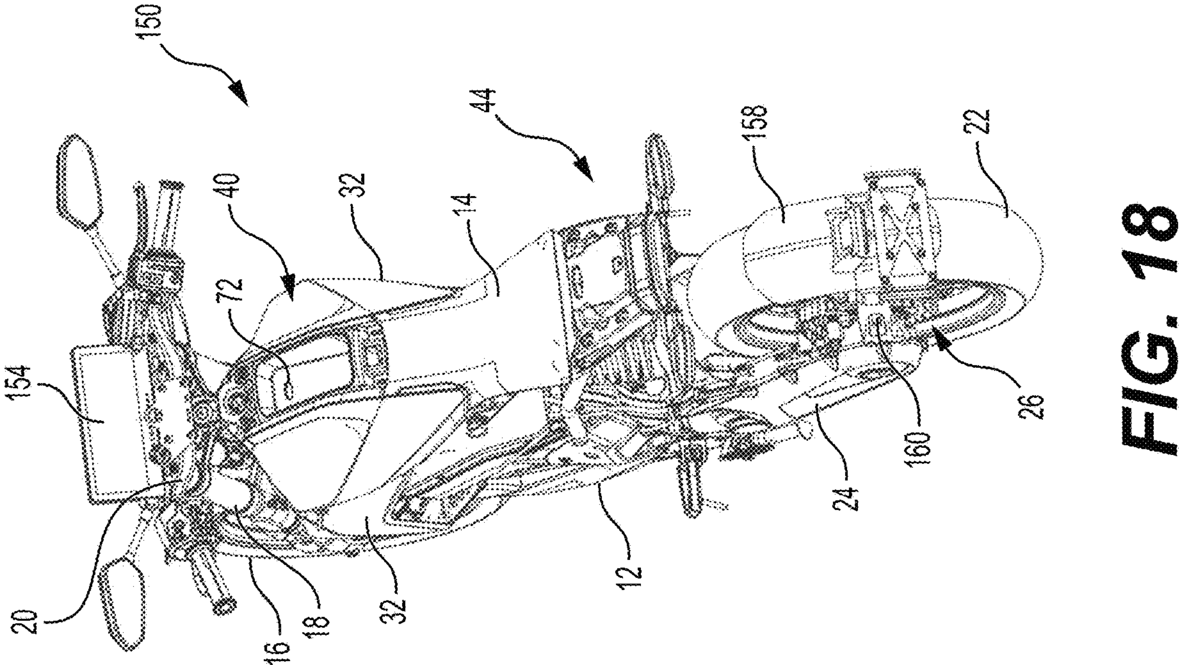
FIG. 18 is a perspective view, taken from a rear, left side, of the motorcycle of FIG. 14, with the cover of the glove box being removed.
Figure 19:
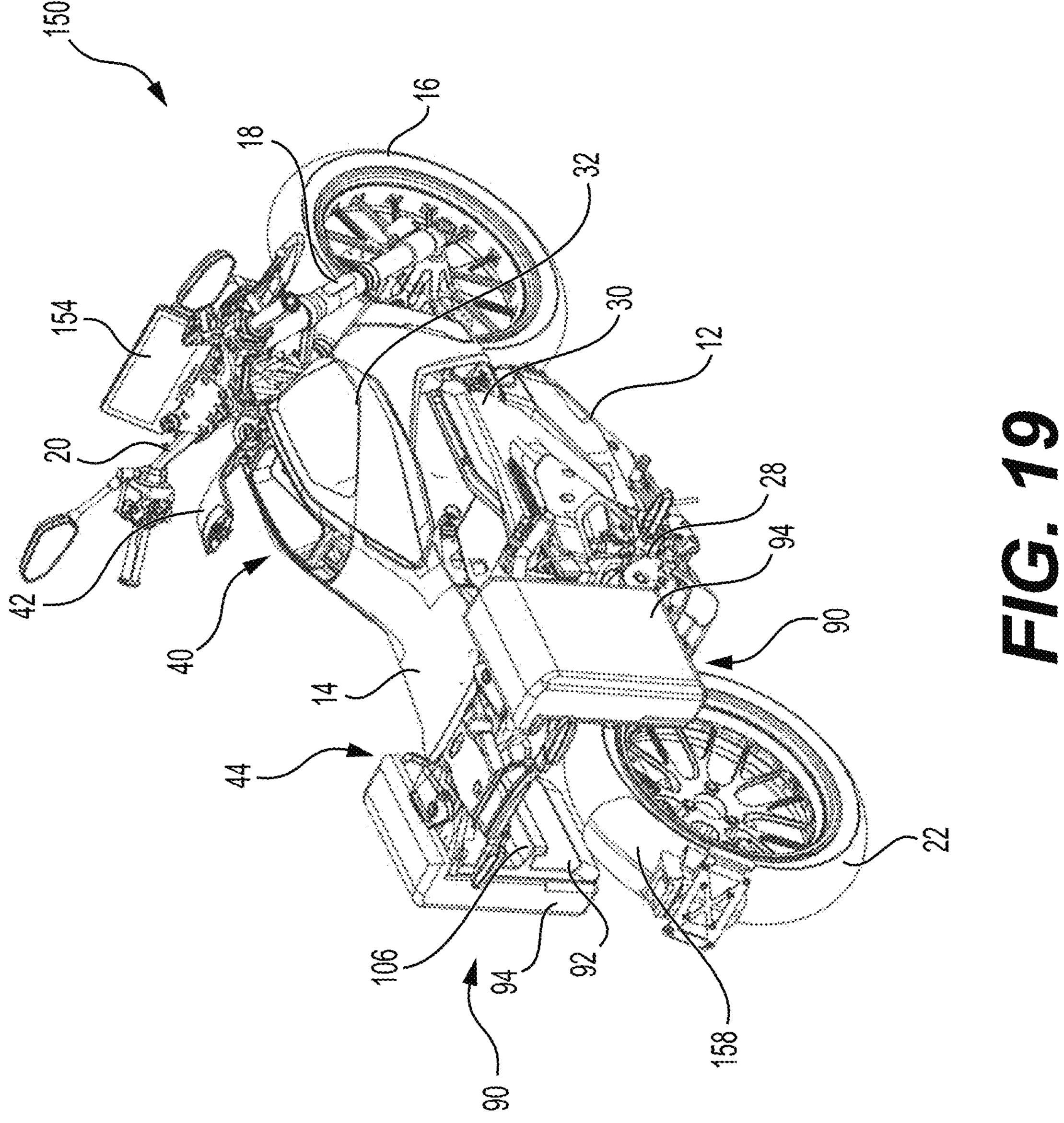
FIG. 19 is a perspective view, taken from a rear, right side, of the motorcycle of FIG. 14 with saddlebags mounted thereto.
Figure 20:
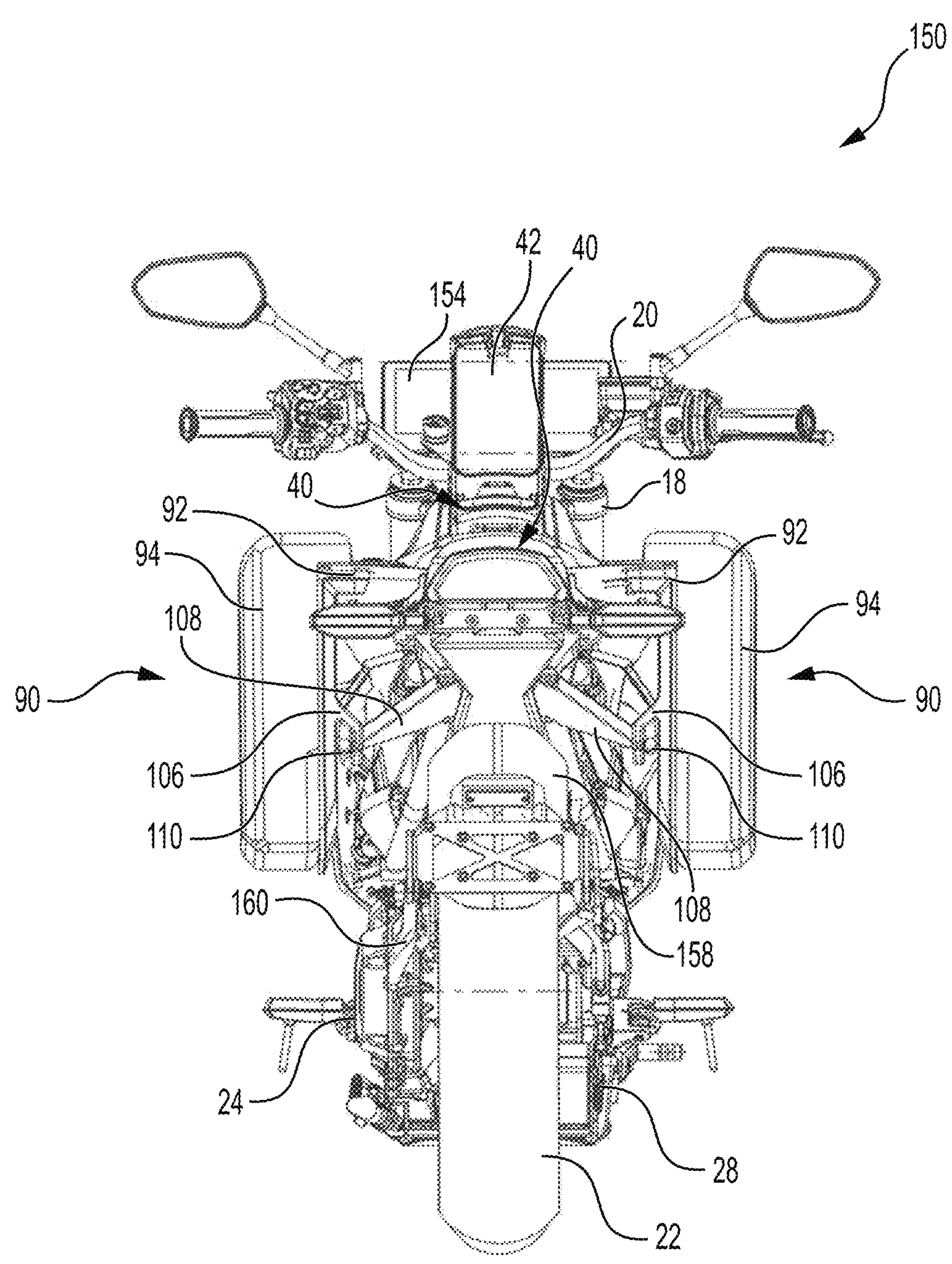
FIG. 20 is a rear elevation view of the motorcycle and saddlebags of FIG. 19.

The motorcycle 150 has a display 154 that is mounted to the handlebar 20. As such, when the handlebar 20 is turned, the display 154 turns with the handlebar 20. In the motorcycle 150, the position of the handlebar 20 relative to the seat 20 is adjustable. The headlight housing 152 and the display 154 together define a front structure of the motorcycle 150. The display 154 defines a hexagonal aperture 156 near a front thereof, as best seen in FIG. 16. The hexagonal aperture 156 allows various accessories to be connected to the display 154 in a manner similar to the ones described above. In some embodiments, each of the apertures 48, 154 is at least 20 mm wide by 5 mm long. In some embodiments, each of the apertures 48, 154 has a surface area of at least 100 $mm^2$.

The motorcycle 150 also has a rear fender 158 disposed over part of the rear wheel 22. The rear fender 158 is connected to the swingarm 24 by an arm 160.

Turning now to FIGS. 22 to 25, the anchors 200 and 400 and the accessory connector 300 will be described in more detail. As described above, the anchors 200 and 400 and the accessory connector 300 can be used to connect various accessories to the motorcycles 10 and 150 using the various hexagonal apertures defined thereon.

Figure 22:
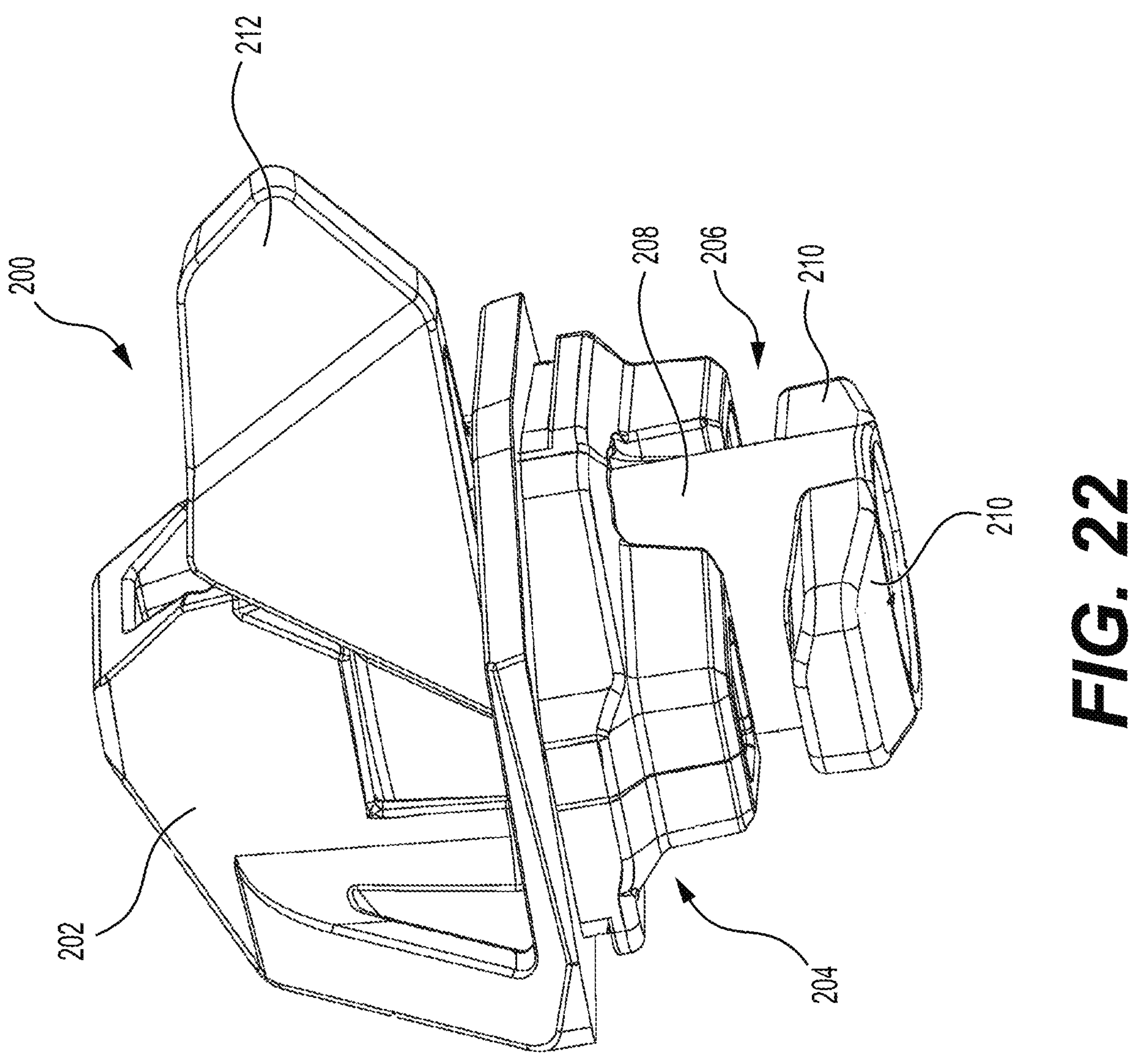
FIG. 22 is a perspective view of an anchor to be used with the motorcycles of FIGS. 1 and 14, with the anchor being in an unlocked position.
Figure 23:
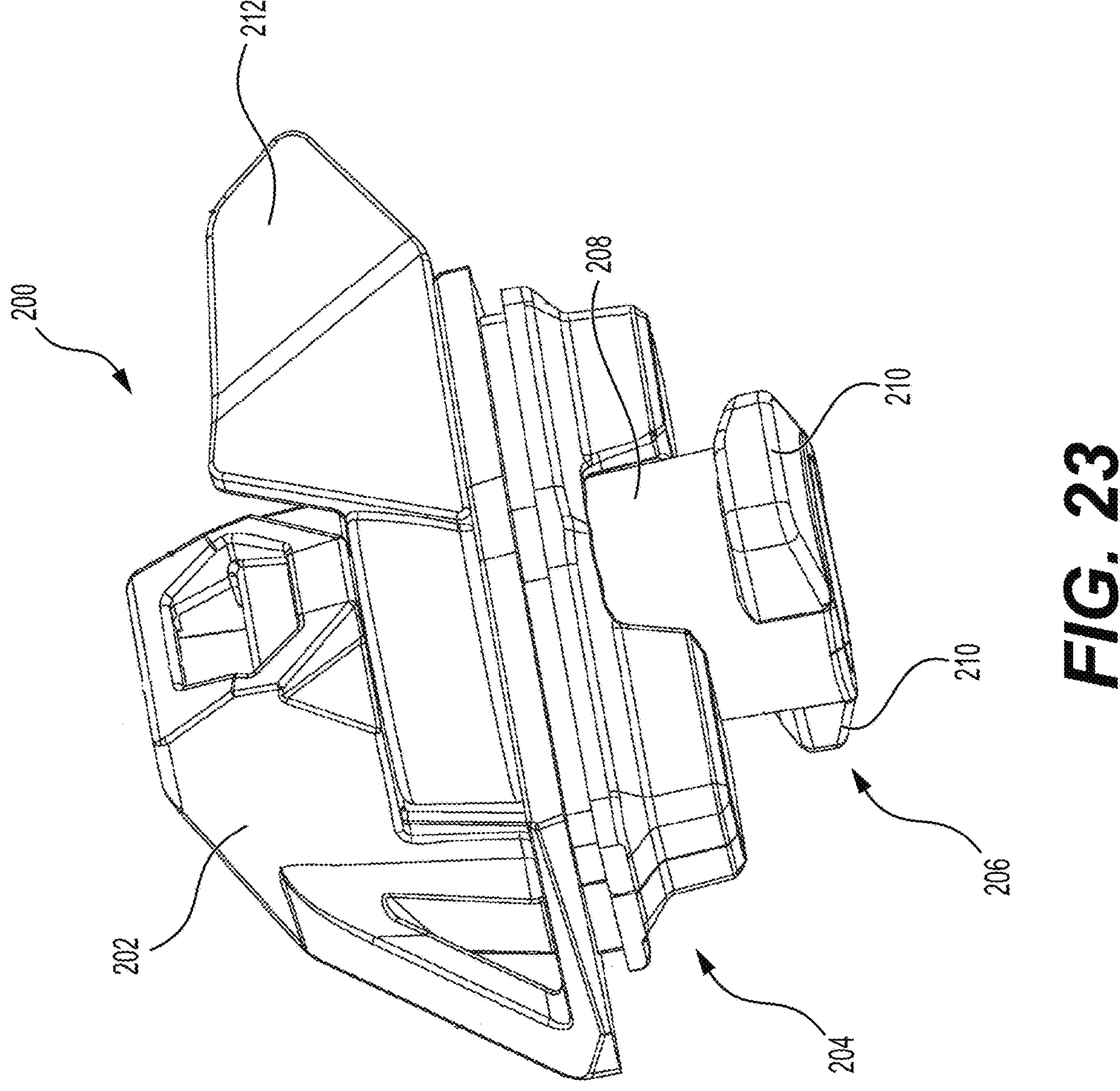
FIG. 23 is a perspective view of the anchor of FIG. 22, with the anchor being in a locked position.

With reference to FIGS. 22 and 23, the anchor 200 will be briefly described. The anchor 200 has a case 202. A lower portion 204 of the case 202 is shaped to be received in a hexagonal aperture such as the ones provided on the motorcycles 10 and 150. A latch 206 includes a stem 208 and a pair of cams 210. The pair of cams 210 define a generally hexagonal shape. The stem 208 extends in the case 202. A lever 212 is connected to the stem 202. By moving the lever 212, the latch 206 can be moved between an unlocked position (FIG. 22) and a locked position (FIG. 23). The pair of cams 210 rotates by about 90 degrees between the locked and unlocked positions. It is contemplated that instead of having a case 202, the features of the case could be incorporated directly into an accessory. Additional details regarding the anchor 200 can be found in U.S. Pat. No. 8,777,531 B2, issued Jul. 15, 2014, the entirety of which is incorporated herein by reference. Since the anchor 200 can be quickly and easily locked and unlocked without using tools, the anchor 200 is what is known as a quick-attach anchor.

Figure 24:
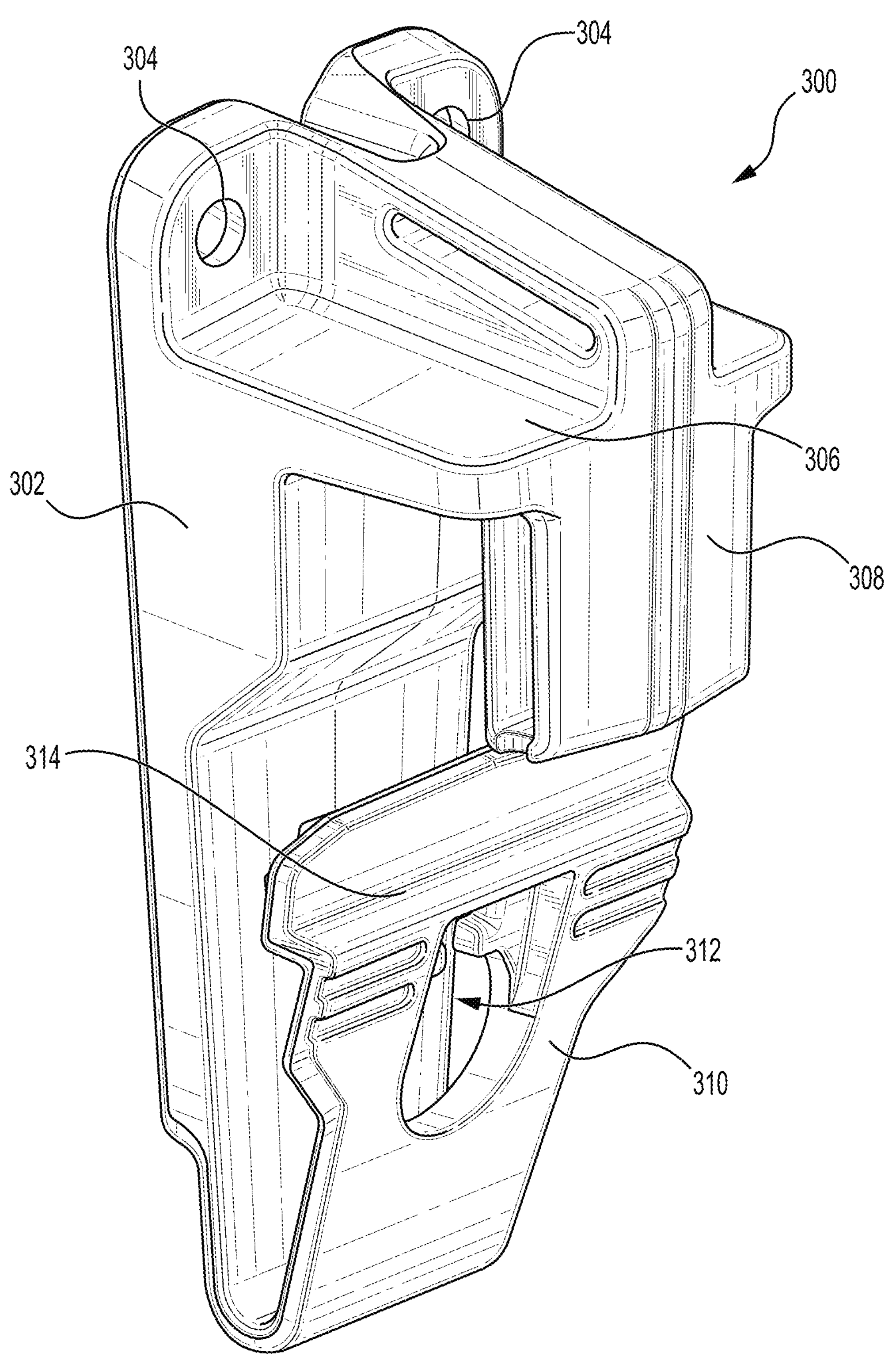
FIG. 24 is a perspective view of an accessory connector to be used with the motorcycles of FIGS. 1 and 14.

With reference to FIG. 24, the accessory connector 300 will be described in more detail. The accessory connector 300 has a supporting portion 302 that, in use, is connected to an accessory, such as a saddlebag for example. The supporting portion 302 defines three fastening openings 304 (only two of which are visible in FIG. 24) through which, in use, fasteners are inserted to connect the accessory connector 300 to the accessory. An overhanging portion 306 of the accessory connector 300 extends from the supporting portion 302.

The accessory connector 300 includes a post 308 which is configured to be inserted into a hexagonal aperture, such as one of the apertures 74 of the rear rack 44 of the motorcycle 10 or 150. The post 308 extends vertically downward from the overhanging portion 306. The post 308 has a generally hexagonal shape complementary to the shape of the aperture in which it is intended to be inserted.

The accessory connector 300 also includes a movement limiter 310 configured to limit movement, particularly vertical movement, of the accessory connector 300 relative to the part of the motorcycle 10 or 150 to which it is to be connected. The movement limiter 310 is connected to a lower end of the supporting portion 302. The movement limiter 310 defines an opening 312 for accessing the fastening opening 304 (not shown) aligned therewith. The movement limiter 310 defines a shoulder 314. The movement limiter 310 can be pushed toward the supporting portion 302 and is biased toward the position show in FIG. 24.

The method for using the accessory connector 300 will now be briefly described. For purposes of this description, the accessory connector 300 will be used to connect an accessory to the rear rack 44 of the motorcycle 10 using one of the apertures 74. The accessory connector 300 is fastened to the accessory by fasteners inserted through the fastening openings 304. The accessory connector 300, with the accessory connected thereto, is positioned such that the post 308 is aligned with the aperture 74 and the lower end of the accessory connector 300 is disposed laterally outward of the rear rack 44. The accessory connector 300 is then lowered such that the post 308 is inserted into the aperture 74. As the accessory connector 300 is lowered, the movement limiter 310 abuts the outer edge of the rear rack 44 and is pushed toward the supporting portion 302. Once the shoulder 314 passes the lower corner of the outer edge the rear rack 44, the movement limiter 310 moves away from the supporting portion 302 such that the shoulder 314 is disposed under the rear rack 44. As a result, attempting to lift the accessory connector 300 causes the shoulder 314 to abut the bottom of the rear rack 44, thereby preventing the accessory connector 300 from being lifted. To remove the accessory connector 300, the movement limiter 310 has to be manually pushed toward the supporting portion 302 such that the shoulder 314 is no longer under the rear rack 44, and then the accessory connector 300 can be lifted. It is contemplated that the accessory connector 300, or at least the supporting portion, could be integrally formed with the accessory. Since the accessory connector 300 can be used to quickly and easily connect and disconnect an accessory to/from another element without using tools, the accessory connector 300 is what is known as a quick-attach accessory connector.

In one embodiment, two accessory connectors 300 are fastened to a saddlebag and are used to connect the saddlebag to the rear rack 44 of the motorcycle 10 or 150 using the two apertures 74 on one side of the rear rack 44.

Figure 25:
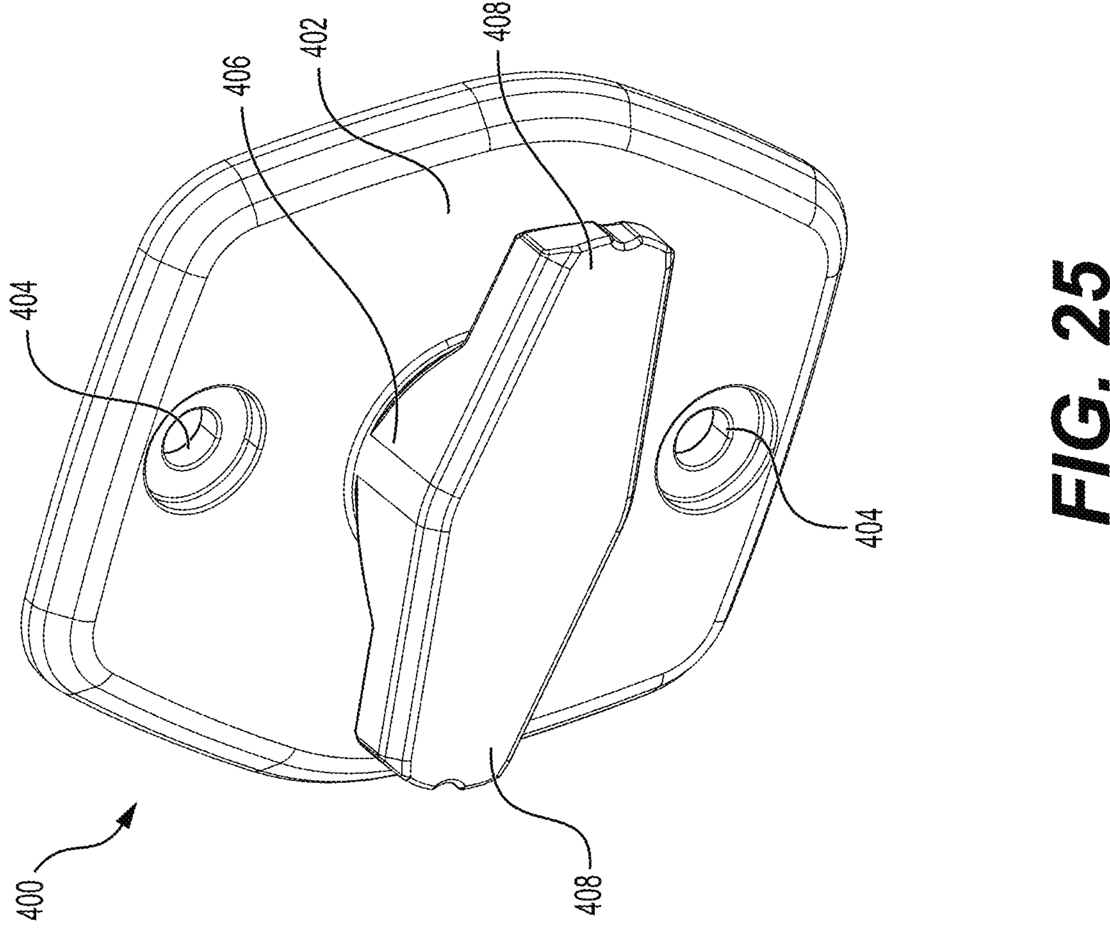
FIG. 25 is a perspective view of an alternative embodiment of an anchor to be used with the motorcycles of FIGS. 1 and 14.

With reference to FIG. 25, the anchor 400 will be described in more detail. The anchor 400 has an anchor base 402. The anchor base 402 defines two fastening opening 404 through which, in use, fasteners are inserted to connect the anchor 400 to the accessory. It is contemplated that the anchor base 402 could be integral with the accessory or could be connected through means other than fasteners, such as by adhesive or stitching. A stem 406 is connected to the anchor base 402. A pair of cams 408 extend from the end of the stem 406. The stem 406 and the cams 408 are fixed relative to the anchor base 402.

To connect the anchor 400 to a portion of the motorcycle 10 or 150, the cam 408 and the stem 406 are inserted into one of the hexagonal apertures defined by the motorcycle 10 or 150. The entire anchor 400 is then rotated by 90 degrees. As the anchor 400 is rotated, the cams 408 engage the surface surrounding the hexagonal aperture, which creates a force that pushes the anchor base 402 toward the motorcycle 10 or 150. As a result, the anchor 400 can no longer freely rotate relative to the hexagonal aperture, and a certain force needs to be applied in order to rotate the entire anchor 400 by 90 degrees in order to disengage the anchor 400. Since the anchor 400 can be used to quickly and easily connect and disconnect an accessory to/from another element without using tools, the anchor 400 is what is known as a quick-attach anchor.

It is contemplated that in some embodiments, the apertures defined on the motorcycles 10 and 150 used to connect the various accessories could have a shape other than hexagonal, in which case the various elements intended to be inserted through these apertures, such a pegs and cams, would have shape complementary to this other shape.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A motorcycle comprising:
- a frame;
- a seat supported by the frame;
- a rear wheel operatively connected to the frame;
- a front wheel operatively connected to the frame;
- a motor operatively connected to the rear wheel for driving the rear wheel;
- a handlebar operatively connected to the front wheel for steering the front wheel; and
- a front structure connected to the frame and being disposed at least in part forward of the handlebar and vertically higher than the front wheel,
- the front structure defining two first apertures on either side thereof,
- the front structure defining a second aperture on a top thereof,
- the two first apertures and the second aperture each being adapted to receive a coupler for mounting an accessory to the front structure via the coupler,
- the coupler being at least one of a quick-attach anchor and a quick-attach accessory connector,
- the two first apertures and the second aperture being longitudinally forward of the handlebar.

2. The motorcycle of claim 1, further comprising:
- the accessory; and
- at least one coupler received in at least one of the first and second apertures and connecting the accessory to the front structure.

3. The motorcycle of claim 2, wherein the at least one coupler is integrated with the accessory.

4. The motorcycle of claim 2, wherein:
the at least one coupler is separate from the accessory;
the accessory has a third aperture; and
the at least one coupler is inserted through the third aperture in the accessory and the one of the first and second apertures to connect the accessory to the front structure.

5. The motorcycle of claim 2, further comprising a headlight connected to the frame;
wherein:
the front structure comprises a headlight housing housing the headlight; and
the two first apertures are defined on either side of the headlight housing.

6. The motorcycle of claim 5, wherein the second aperture is defined in a top of the headlight housing.

7. The motorcycle of claim 6, wherein:
the front structure further comprises a display connected to the headlight housing;
the two first apertures are disposed below the display; and
the second aperture is disposed forward of the display.

8. The motorcycle of claim 5, wherein:
the front structure further comprises a display connected to the handlebar; and
the second aperture is defined in the display.

9. The motorcycle of claim 5, wherein each of the two first apertures extends laterally inward and rearward from its respective side of the headlight housing.

10. The motorcycle of claim 5, wherein the accessory is a windshield connected to the headlight housing via the two first apertures and the second aperture.

11. The motorcycle of claim 10, wherein:
the windshield has two arms;
the at least one coupler includes two accessory connectors;
the two accessory connectors are two pegs;
each arm has one of the two pegs; and
each peg is received in a corresponding one of the first apertures.

12. The motorcycle of claim 11, wherein each of the two peg clips onto the headlight housing.

13. The motorcycle of claim 11, wherein:
the second aperture is defined in a top of the headlight housing;
the at least one coupler further includes the anchor;
the anchor is mounted to the windshield; and
the anchor is received in the second aperture.

14. The motorcycle of claim 11, wherein the windshield comprises:
a front headlight cover covering the headlight; and
a wind deflector extending upward and rearward from the headlight cover.

15. The motorcycle of claim 1, wherein the first and second apertures are hexagonal.

16. A windshield for a motorcycle comprising:
a wind deflector; and
two arms connected to the wind deflector, each arm having a peg extending inward from the arm along a laterally extending axis, the pegs being configured to be received in laterally facing apertures defined in the motorcycle.

17. The windshield of claim 16, further comprising an anchor mounted to a rear side of the wind deflector, the anchor being configured for connecting the windshield to the motorcycle.

18. The windshield of claim 17, wherein the anchor comprises:
a latch; and
a lever connected to the latch to turn the latch between a locked position and an unlocked position.

19. The windshield of claim 18, wherein:
the latch has a pair of cams defining a hexagonal shape; and
the pegs are hexagonal pegs.

20. The windshield of claim 16, further comprising a headlight cover configured to cover a headlight of the motorcycle; and
wherein:
the wind deflector extends upward and rearward from the headlight cover; and
the two arms extend rearward and laterally outward from the headlight cover.

* * * * *